US008854196B2

(12) United States Patent
Tamaki et al.

(10) Patent No.: US 8,854,196 B2
(45) Date of Patent: Oct. 7, 2014

(54) VEHICLE APPROACH NOTIFICATION APPARATUS FOR ELECTRIC MOTORCYCLE

(75) Inventors: Kenji Tamaki, Saitama (JP); Ryuji Akiba, Saitama (JP); Yoshihiro Nomura, Saitama (JP); Hiroyuki Shinmura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 13/250,234

(22) Filed: Sep. 30, 2011

(65) Prior Publication Data

US 2012/0081217 A1      Apr. 5, 2012

(30) Foreign Application Priority Data

Sep. 30, 2010   (JP) .................................. 2010-221599

(51) Int. Cl.
| | |
|---|---|
| *B62K 19/40* | (2006.01) |
| *B60R 9/06* | (2006.01) |
| *B60R 11/06* | (2006.01) |
| *B60Q 5/00* | (2006.01) |
| *B62J 3/00* | (2006.01) |

(52) U.S. Cl.
CPC .............. *B62J 3/00* (2013.01); *B62K 2204/00* (2013.01); *B62K 2202/00* (2013.01); *B62K 2208/00* (2013.01); *B60Q 5/008* (2013.01)
USPC .................. 340/425.5; 340/693.5; 340/693.9; 340/693.1

(58) Field of Classification Search
CPC ....... B60I 2270/42; B60Q 5/008; B60Q 5/00; B62K 19/40; B62K 19/46; B60R 9/06; B60R 11/06; B62J 3/00; B62J 17/02; B62J 17/06; B62J 7/06

USPC ................................. 340/693.5, 693.9, 693.1
See application file for complete search history.

(56) References Cited

U.S. PATENT DOCUMENTS

| | | | | |
|---|---|---|---|---|
| 2,979,831 | A | * | 4/1961 | Bullock .......................... 434/64 |
| 3,858,389 | A | * | 1/1975 | Isuruishi ....................... 368/245 |
| 4,577,917 | A | * | 3/1986 | Nashimoto et al. ............ 439/655 |
| 4,697,842 | A | * | 10/1987 | Kawasaki ..................... 296/78.1 |

(Continued)

FOREIGN PATENT DOCUMENTS

| | | |
|---|---|---|
| CN | 2841480 Y | 11/2006 |
| CN | 1966339 A | 5/2007 |

(Continued)

*Primary Examiner* — Daniel Wu
*Assistant Examiner* — John Bamert
(74) *Attorney, Agent, or Firm* — Birch, Stewart, Kolasch & Birch, LLP

(57) ABSTRACT

An electric motorcycle includes a front cover for covering a head pipe of a vehicle body frame from a forward direction and a speaker for notifying an individual, such as a walker or the like, of the approach of a vehicle. The speaker has a sound emitting direction directed forwardly on the vehicle body and is disposed at a position on the opposite side to a key cylinder of a main switch, which is disposed in a vehicle body sideward direction of the head pipe, across the head pipe. A front stay support a front carrier disposed on the vehicle body front side of the front cover and is attached to the vehicle body front side of the head pipe is provided on the vehicle body rear side of the front cover. The speaker is disposed above the front stay as viewed in front elevation of the vehicle body.

20 Claims, 27 Drawing Sheets

(56) References Cited

U.S. PATENT DOCUMENTS

| | | | |
|---|---|---|---|
| 5,517,173 A * | 5/1996 | Cha et al. | 340/404.1 |
| 6,592,375 B2 * | 7/2003 | Gruber et al. | 434/62 |
| 6,987,446 B2 * | 1/2006 | Konno et al. | 340/426.1 |
| 7,210,548 B2 * | 5/2007 | Yonehana et al. | 180/68.5 |
| 8,104,936 B2 * | 1/2012 | Li | 362/475 |
| 8,547,218 B2 * | 10/2013 | Tamaki et al. | 340/466 |
| 2005/0210858 A1 * | 9/2005 | Gore et al. | 60/201 |
| 2005/0211488 A1 * | 9/2005 | Gore et al. | 180/219 |
| 2005/0267674 A1 * | 12/2005 | Suzuki et al. | 701/200 |
| 2009/0080672 A1 * | 3/2009 | Smith | 381/86 |
| 2010/0089307 A1 * | 4/2010 | Kenchington | 116/28 R |

FOREIGN PATENT DOCUMENTS

| | | |
|---|---|---|
| EP | 0 755 819 A1 | 1/1997 |
| EP | 1 211 170 A2 | 6/2002 |
| JP | 2894157 * | 5/1999 |
| JP | 2005-145203 A | 6/2005 |
| JP | 2008-195137 A | 8/2008 |

\* cited by examiner

VEHICLE APPROACH NOTIFICATION APPARATUS FOR ELECTRIC MOTORCYCLE

CROSS-REFERENCE TO RELATED APPLICATIONS

The present application claims priority under 35 USC 119 to Japanese Patent Application No. 2010-221599 filed on Sep. 30, 2010 the entire contents of which are hereby incorporated by reference.

BACKGROUND OF THE INVENTION

1. Field of the Invention

This invention relates to a vehicle approach notification apparatus for an electric motorcycle, and more particularly to a vehicle approach notification apparatus for an electric motorcycle that issues a notification sound for notifying a walker or the like of approach of an electric motorcycle.

2. Description of Background Art

In recent years, in the development of the electric vehicle or a hybrid vehicle, the driving sound when the vehicle is operated by an electric motor is weak in comparison with the driving sound of an engine vehicle. Thus, an individual, such as a walker or the like, is less likely to hear an approaching electric or hybrid vehicle. Thus, an appropriate countermeasure against this subject is desired.

In Japanese Patent Laid-Open No. 2008-195137, a vehicle approach notification apparatus is disclosed wherein, when it is detected that the vehicle speed of a hybrid four-wheeled car is being operated principally at a low speed running, with a driving force of an electric motor is lower than a predetermined value and the brake is being operated, a notification sound is outputted from a speaker disposed on the inner side of a bumper at a front portion of a vehicle body so that the approach of the vehicle is identified to an individual, such as a walker or the like.

However, with the technique disclosed in Japanese Patent Laid-Open No. 2008-195137, the height of the attached position of the speaker which emits a notification sound is low, and in order to further enhance the notification effect to an individual, such as a walker or the like, there is a room to further improve on the position of attachment of the speaker. Further, when the speaker is attached to an electric motorcycle which has a limited surplus space on the front face thereof in comparison with a four-wheeled vehicle, since a very large speaker cannot be applied, the positioning of a speaker of a comparatively small size with a high notification effect is required.

SUMMARY AND OBJECTS OF THE INVENTION

It is an object of an embodiment of the present invention to provide a vehicle approach notification apparatus for an electric motorcycle wherein the disposition of a speaker for emitting a notification sound for notifying an individual, such as a walker or the like, of the approach of an electric motorcycle is optimized.

In order to achieve the object described above, an embodiment of the present invention provides a vehicle approach notification apparatus for an electric motorcycle (1) wherein the notification sound for notifying an individual, such as a walker or the like, of the approach of a vehicle is outputted from a speaker (60) attached to a vehicle body, wherein the electric motorcycle (1) is a saddle type vehicle that includes a front cover (7) for covering a head pipe (36) of a vehicle body frame (34) from a forward position, and the speaker (60) has a sound emitting direction directed to the front on the vehicle body rear side of the front cover (7) and is disposed at a position on the opposite side to a key cylinder (115) of a main switch, that is disposed in a vehicle body sideward direction of the head pipe (36), across the head pipe (36).

Further, according to an embodiment of the present invention a front stay (33) for supporting a front carrier (6) is disposed on the vehicle body front side of the front cover (7) for attaching to the vehicle body front side of the head pipe (36) is provided on the vehicle body rear side of the front cover (7), and that the speaker (60) is disposed above the front stay (33) as viewed in front elevation of the vehicle body.

According to an embodiment of the present invention, the speaker (60) is disposed above the front carrier (6) as viewed in front elevation of the vehicle body.

Further, according to an embodiment of the present invention, a second speaker (70) having a sound emitting direction directed in the vehicle body forward direction is provided substantially at a position in the center of the vehicle body below a seat (24) of the electric motorcycle (1), for emitting sound from the second speaker (70) to be reflected at least to a vehicle body sideward direction by a leg shield (10) which is disposed continuously to the vehicle body rear side of the front cover (7) and is disposed in an opposing relationship to the legs of a rider.

According to an embodiment of the present invention, the second speaker (70) is attached to a wall face on the vehicle body front side of an accommodating box (49) provided below the seat (24).

According to an embodiment of the present invention, the speaker (60) is disposed on the left side in the vehicle widthwise direction of the head pipe (36).

According to an embodiment of the present invention, a second speaker (70b) is provided substantially at a position at the center of the vehicle body below a seat (24) of the electric motorcycle (1), and the vehicle approach notification apparatus further includes a sound guiding duct (154) for guiding the sound generated from the second speaker (70b) in leftward and rightward directions of the vehicle body.

According to an embodiment of the present invention, a cover member (90, 91, 95) in which a passing hole for the emitted sound is formed is removably attached to a position of the front cover (7) on the vehicle body front side of the speaker (60).

According to an embodiment of the present invention, the cover member (95) is configured such that an opening area of the passing hole is variable.

According to an embodiment of the present invention, the cover member (95) includes a base member (96) having a window portion (96a) as the passing hole, and a rotatable plate (97) for blocking off at least part of the window portion (96a), and an operating projection (100) for rotationally operating the rotatable plate (97) from the vehicle body front side to change the degree of the blocking-out degree of the window portion (96a) is formed on the rotatable plate (97).

According to an embodiment of the present invention, a second speaker (70b) having a sound emitting direction directed in the vehicle body downward direction is provided at a position of the electric motorcycle (1) below a low floor (15), and a sound guiding duct (177) of a horn shape is provided around the second speaker (70b).

According to an embodiment of the present invention, the second speaker (70b) and the sound guiding duct (177) are attached to a bottom face of a battery case (47) provided below the low floor (15).

According to an embodiment of the present invention, a sensor main body (67) of a throttle opening sensor is disposed at a position below the key cylinder (115) on the vehicle body rear side of the front cover (7) with a throttle cable (114) connected to the sensor main body (67) passing in an arcuately curved state between the head pipe (36) and the speaker (60) forwardly of the head pipe (36) and is connected to a pulley (110) attached to the sensor main body (67).

According to an embodiment of the present invention, the electric motorcycle is a saddle type vehicle that includes a front cover for covering a head pipe of a vehicle body frame from a forward direction, and the speaker has the sound emitting direction directed forwardly on the vehicle body rear side of the front cover and is disposed at the position on the opposite side to the key cylinder of the main switch, which is disposed in a vehicle body sideward direction of the head pipe, across the head pipe. Therefore, in the electric motorcycle, the speaker can be disposed at a comparatively high position sidewardly of the head pipe, and also where the speaker is of a small size, generation of sound to an individual, such as a walker, can be placed in a good state. Further, it is easy to assure a disposition space for the speaker with a space on the opposite side to the main switch. In addition, the layout of a wiring line for the speaker is facilitated since the main switch and the speaker are disposed in the proximity of each other.

According to an embodiment of the present invention, the front stay for supporting the front carrier disposed on the vehicle body front side of the front cover is attached to the vehicle body front side of the head pipe and is provided on the vehicle body rear side of the front cover, and the speaker is disposed above the front stay as viewed in front elevation of the vehicle body. Therefore, the speaker does not interfere with the front stay, and generation of a sound notification is not disturbed. In addition, the degree of freedom in disposition of the speaker can be enhanced.

According to an embodiment of the present invention, the speaker is disposed above the front carrier as viewed in a front elevation of the vehicle body. Therefore, even when luggage is piled on the front carrier, the possibility that the sound generation from the speaker may be disturbed is low. Thus, good sound generation can be carried out.

According to an embodiment of the present invention, the second speaker having a sound emitting direction directed in the vehicle body forward direction is provided substantially at the position of the center of the vehicle body below the seat of the electric motorcycle, and emitted sound from the second speaker is reflected at least to a vehicle body sideward direction by the leg shield which is disposed continuously to the vehicle body rear side of the front cover and is disposed in an opposing relationship to the legs of a rider. Therefore, good sound generation also to an individual, such as a walker, or a four-wheeled vehicle positioned sidewardly of the vehicle can be achieved.

According to an embodiment of the present invention, the second speaker is attached to the wall face on the vehicle body front side of the accommodating box provided below the seat. Therefore, an attaching member for exclusive use by the speaker is unnecessary. Further, the accommodating box serves also as an echoing member for the speaker, and a desired sound pressure can be assured using a speaker of a small size.

According to an embodiment of the present invention, the speaker is disposed on the left side in the vehicle widthwise direction of the head pipe. Therefore, it is possible to cause sound generation to be recognized well by an individual, such as a walker, on a footway provided on the left side of a driving lane.

According to an embodiment of the present invention, the second speaker is provided substantially at the position in the center of the vehicle body below the seat of the electric motorcycle. In addition, the vehicle approach notification apparatus further includes a sound guiding duct for guiding the sound generated from the second speaker in leftward and rightward directions of the vehicle body. Therefore, in whatever manner the direction of the second speaker is set, it is possible to emit a sound in the leftward and rightward directions of the vehicle by means of the sound guiding duct. Consequently, the degree of freedom in the disposition of the second speaker can be enhanced.

According to an embodiment of the present invention, the cover member in which the passing hole for the emitted sound is formed is removably attached to the position of the front cover on the vehicle body front side of the speaker. Therefore, by arbitrarily setting the sound generation opening of the sound generation cover member, an arbitrary sound pressure in accordance with the size of the speaker or a characteristic of the vehicle can be set without changing the front cover. Consequently, an apparatus having high universality can be provided.

According to an embodiment of the present invention, the cover member is configured such that the opening area of the passing hole is variable. Therefore, a desired generation sound pressure can be set readily without replacing the cover member.

According to an embodiment of the present invention, the cover member includes the base member having the window portion as the passing hole, and the rotatable plate for blocking off at least part of the window portion. Further, the operating projection for rotationally operating the rotatable plate from the vehicle body front side to change the degree of the blocking-out degree of the window portion is formed on the rotatable plate. Therefore, the configuration for varying the opening area of the passing hole can be obtained readily.

According to an embodiment of the present invention, the second speaker having the sound emitting direction directed in the vehicle body downward direction is provided at the position of the electric motorcycle below the low floor, and the sound guiding duct of a horn shape is provided around the second speaker. Therefore, it is possible to diffuse the emitted sound widely to the road surface by means of the sound guiding duct of a horn shape. Further, the sound is reflected by the road surface and is also directed upwardly. Thus, the sound can be emitted widely around the electric motorcycle.

According to an embodiment of the present invention, the second speaker and the sound guiding duct are attached to a bottom face of a battery case provided below the low floor. Therefore, the battery box of a wide bottom face serves as a good plane of vibration, and even if the speaker is small in size, a sufficient sound generation function can be obtained.

According to an embodiment of the present invention, the sensor main body of the throttle opening sensor is disposed at the position below the key cylinder on the vehicle body rear side of the front cover, and the throttle cable connected to the sensor main body passes in an arcuately curved state between the head pipe and the speaker forwardly of the head pipe and is connected to the pulley attached to the sensor main body. Therefore, the arcuate portion of the acceleration wire extends along the upward and downward direction in the proximity of the head pipe without interference with the speaker. Consequently, a disposition in which the wire is less likely to be influenced by a rotating operation for steering can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
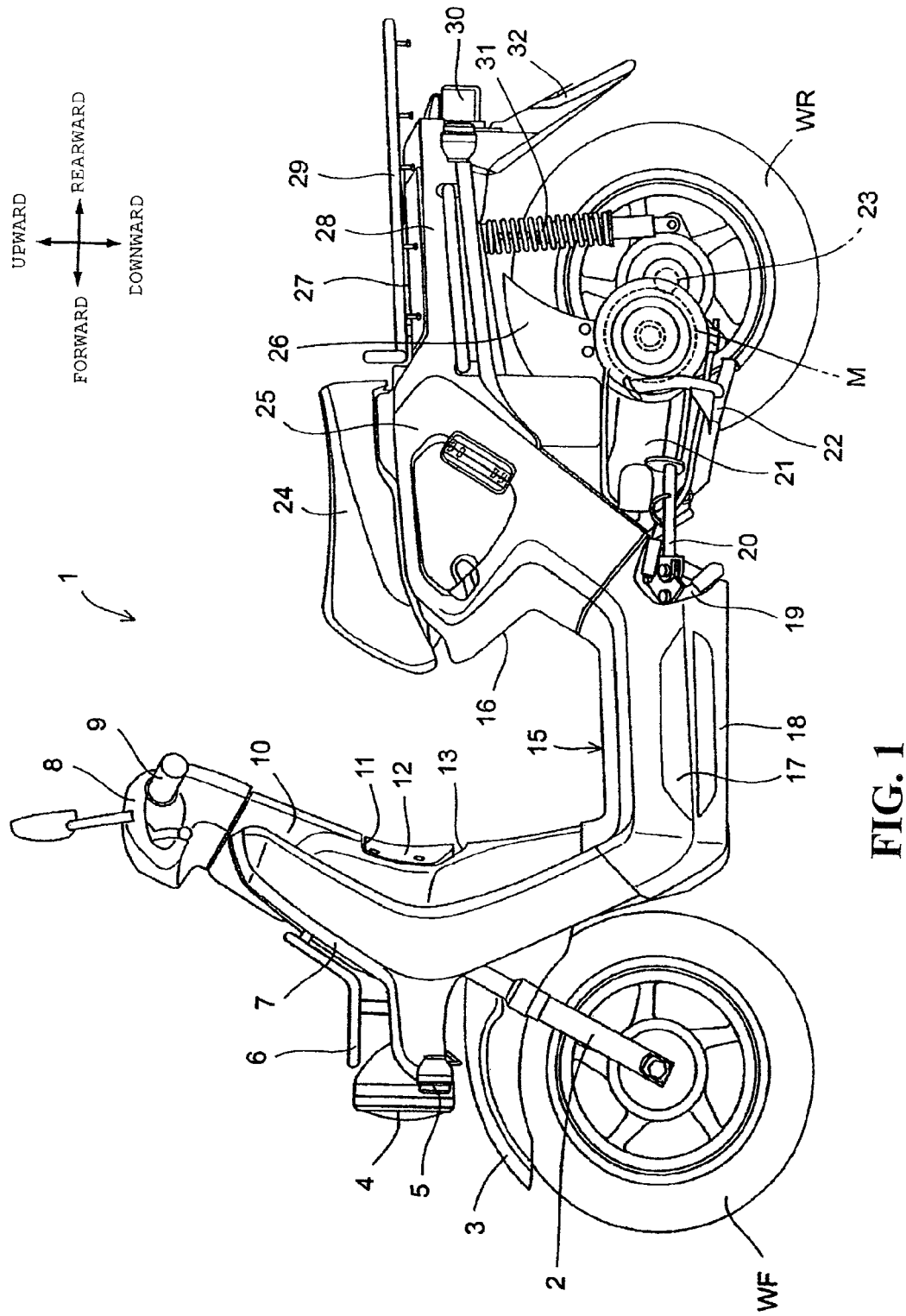
FIG. 1 is a side elevational view of an electric motorcycle which includes a vehicle approach notification apparatus according to an embodiment of the present invention.
Figure 2:
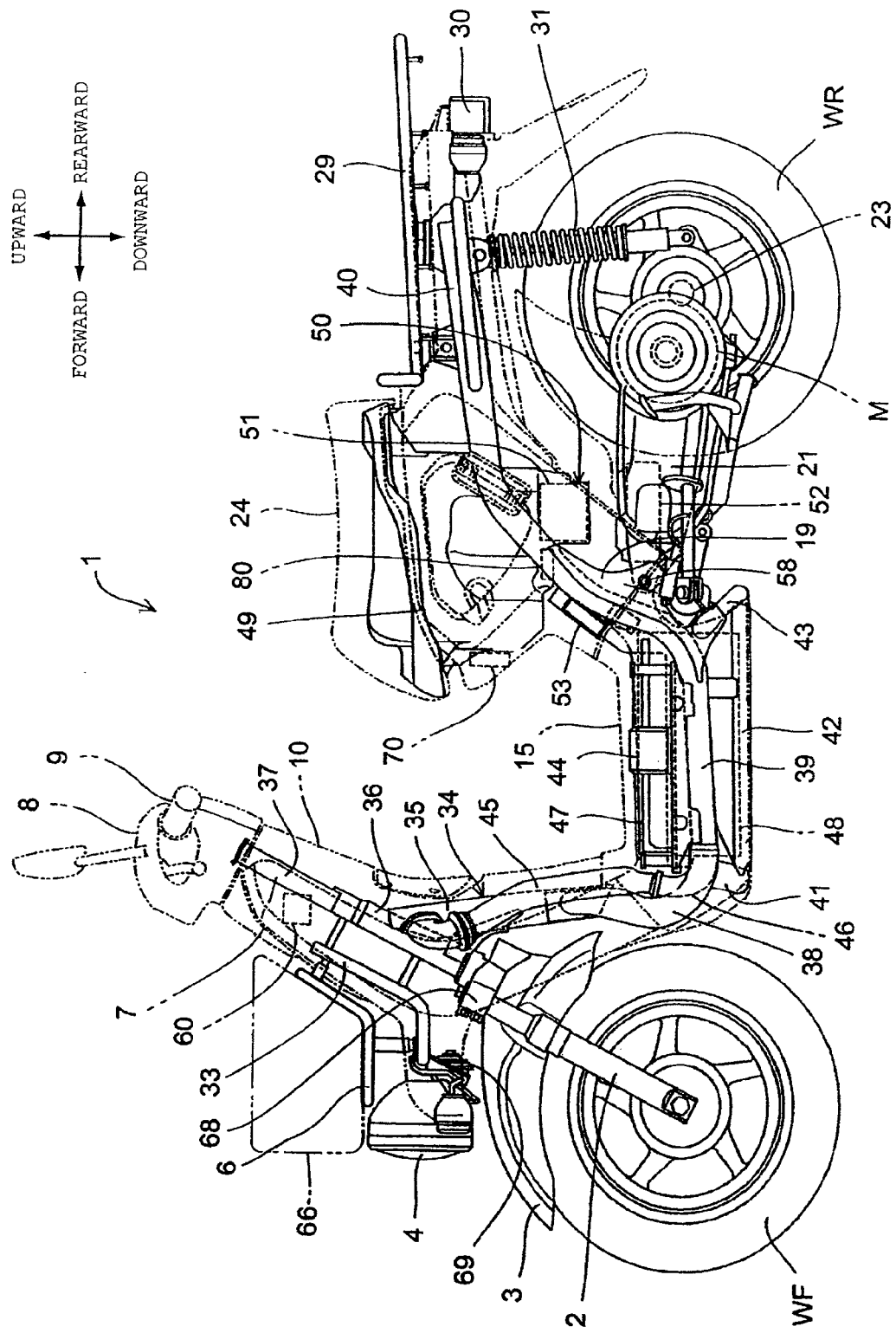
FIG. 2 is a see-through side elevational view of the electric motorcycle.

In the following, embodiments of the present invention are described in detail with reference to the drawings. FIG. 1 is a side elevational view of an electric motorcycle 1 which includes a vehicle approach notification apparatus according to an embodiment of the present invention. Meanwhile, FIG. 2 is a see-through side elevational view of the electric motorcycle 1. The electric motorcycle 1 is a saddle type electric vehicle of the scooter type having a low floor 15, and a rear wheel WR supported for rotation on an axle 23 is driven to rotate by rotating power exhibited by an electric motor M built in a swing arm 21.

A vehicle body frame 34 of the electric motorcycle 1 includes a head pipe 36 inclined rearwardly upwards and supporting a front fork 2 for supporting a front wheel WF for rotation thereon and a steering handle member 9 in the form of a bar connected to an upper portion of the front fork 2 for steering movement, a main frame 35 extending rearwardly downwards from the head pipe 36, a pair of left and right under frames 39 connected to a lower portion of the main frame 35 through curved portions 38 and extending rearwardly, and a pair of left and right rear frames 40 integrally connecting to a rear end of the under frames 39 and extending rearwardly upwards. The head pipe 36 supports a steering stem 37 for rotation thereon, and the steering handle member 9 is secured to an upper end of the steering stem 37. Meanwhile, an under bracket 68 for supporting an upper end portion of the front fork 2 is secured to a lower end portion of the steering stem 37.

On a pivot plate 19 provided at a front portion of the rear frames 40 of the vehicle body frame 34, a side stand 20 for keeping the vehicle body in an erected state inclined to the left side is mounted for pivotal motion, and the swing arm 21 is supported at a front portion thereof for rocking motion through a pivot shaft 58. A rear shock absorber unit 31 is provided between a rear portion of the left side rear frame 40 and a rear portion of the swing arm 21. Further, a main stand 22 for erecting the vehicle body in an upright manner is attached to a lower portion of the swing arm 21. The swing arm 21 is of the cantilever type for supporting the rear wheel WR for rotation only by means of an arm on the left side in the vehicle widthwise direction, and a PDU (power drive unit) 52 for controlling output power of the electric motor M is disposed at a position immediately rearwardly of the pivot shaft 58 forwardly of the cantilever arm.

The electric motorcycle 1 includes a front cover 7 for covering the head pipe 36 from a forward direction, a leg shield 10 extending rearwardly of the head pipe 36 to the front cover 7 in such a manner so as to cover the legs of a rider seated on a seat 24 from a forward direction, the low floor 15 connects to a lower portion of the leg shield 10 such that the feet of the rider seated on the seat 24 are placed thereon for covering a battery case 47 from above. A pair of left and right floor side covers 17 depend from the opposite sides of the low floor 15 in such a manner so as to cover the opposite sides of the under frames 39. An undercover 18 interconnects the lower edges of the floor side covers 17 with a seat lower front cover 16 extending upwardly from a rear end of the low floor 15 in such a manner so as to cover a lower portion of the seat 24 from a forward direction. A pair of left and right side covers 25 connect to the opposite sides of the seat lower front cover 16 in such a manner so as to cover a lower portion of the seat 24 from opposite sides with a rear cover 28 connecting to the side covers 25 and covering the rear wheel WR from above.

The battery case 47 is covered with the low floor 15, the floor side covers 17, the under cover 18, the seat lower front cover 16 and the side covers 25. A headlamp 4 is disposed at a front end of the front cover 7 in such a manner so that it is supported by a front stay 33 secured to the head pipe 36. In addition, a tail lamp 30 is attached to the rear frame 40 with a rear fender 32 is disposed below the tail lamp 30.

Direction indicators 5 are disposed on the left and right of the headlamp 4 in the vehicle widthwise direction with a horn 69 for issuing an alarm being disposed rearwardly of the headlamp 4. A front fender 3, disposed below the front cover 7, is attached to the front fork 2 in such a manner so as to cover the rear wheel WR from above while a sub fender 26 for covering the rear wheel WR from obliquely forwardly and upwardly is attached to an upper portion of the swing arm 21.

The steering handle member 9 is covered at a middle portion thereof in the vehicle widthwise direction with a handle cover 8 with a front carrier 6 disposed forwardly of the front cover 7 being supported on the front stay 33. A load basket 66 or the like can be attached to the front carrier 6. A luggage carrier 27 is provided at an upper portion of the rear cover 28 rearwardly of the seat 24 with a rear carrier 29 being disposed above the luggage carrier 27 and removably attached to the rear frame 40.

The battery case 47 in which a high voltage battery 48 of, for example, 72 V for supplying power to the electric motor M is built is disposed between the left and right under frames 39 in such a manner that it is supported by the under frames 39. Further, a cross member 44 extending across a substantially central portion of the battery case 47 is provided between the left and right under frames 39, and the low floor 15 is supported by the cross member 44.

At a front portion of the under frames 39, a front protective member 41 for protecting a front side lower portion of the battery case 47 from forwardly is provided in such a manner so that a central portion thereof is connected to a lower end of the main frame 35. Further, at a rear portion of the under frames 39, a rear protective member 43 for protecting a rear lower portion of the battery case 47 from rearwardly is provided, and a plurality of lower protective members 42 extending in the forward and backward direction of the vehicle body are provided between the front and rear protective members 41 and 43 in such a manner so that they project the battery case 47 from below.

A pair of left and right cooling air introduction ducts 45 are connected at a downstream end portion thereof to a front portion of the battery case 47 through a connecting pipe 46 with the cooling air introduction ducts 45 extending along the main frame 35 in such a manner so as to sandwich the main frame 35 from the opposite sides in the leg shield 10. Further, a recess 11, concave in the forward direction of the vehicle body, is formed at a position of the leg shield 10 corresponding to the connecting portion between the main frame 35 and the head pipe 36 with a lid 12 that covers an upper portion of the recess 11 being attached to the leg shield 10. An air inlet port 13 is formed between a lower edge of the lid 12 and the recess 11 with the cooling air introduction ducts 45 being connected on an upper end side thereof to the leg shield 10 in a communicating relationship with the air inlet port 13.

A cooling fan 53 is attached to an upper face of a rear portion of the battery case 47 such that air taken in from the air inlet port 13 by operation of the cooling fan 53 is introduced into the battery case 47 through the cooling air introduction ducts 45 and the connecting pipe 46 to thereby cool the high voltage battery 48 in the battery case 47.

An accommodating box 49 made of synthetic resin and disposed below the seat 24 above the swing arm 21 is disposed between the left and right rear frames 40 in such a manner that it is supported by the rear frames 40. The accommodating box 49 is covered from above with the openable and closable seat 24, and an accommodating recess 50 for accommodating therein a low voltage battery 51, for example, of 12 V for supplying power to auxiliaries such as the headlamp 4 and the tail lamp 30 is formed integrally at a lower portion of the rear side of the accommodating box 49 in such a manner that it projects downwardly.

The vehicle approach notification apparatus according to the present invention outputs a predetermined notification sound from the speaker as sound generation means attached to the self vehicle to notify an individual, such as a walker and so forth, of the approach of the self vehicle. In the electric motorcycle 1 according to the present embodiment, a speaker 60 for emitting a notification sound is provided at a position higher than the head pipe 36 on the inner side with respect to the front cover 7. A control unit 80 for controlling the output of the speaker 60 is disposed forwardly of the low voltage battery 51 in the accommodating box 49.

Further, it is possible to provide a plurality of speakers for emitting a notification sound on the vehicle body, and in the present embodiment, a second speaker 70 is disposed on a front end face of the accommodating box 49 centrally in the vehicle widthwise direction. With the second speaker 70, outputted notification sound is reflected by the leg shield 10 and so forth so that the notification sound can be recognized also from the left, right and rear of the vehicle body.

Figure 3:
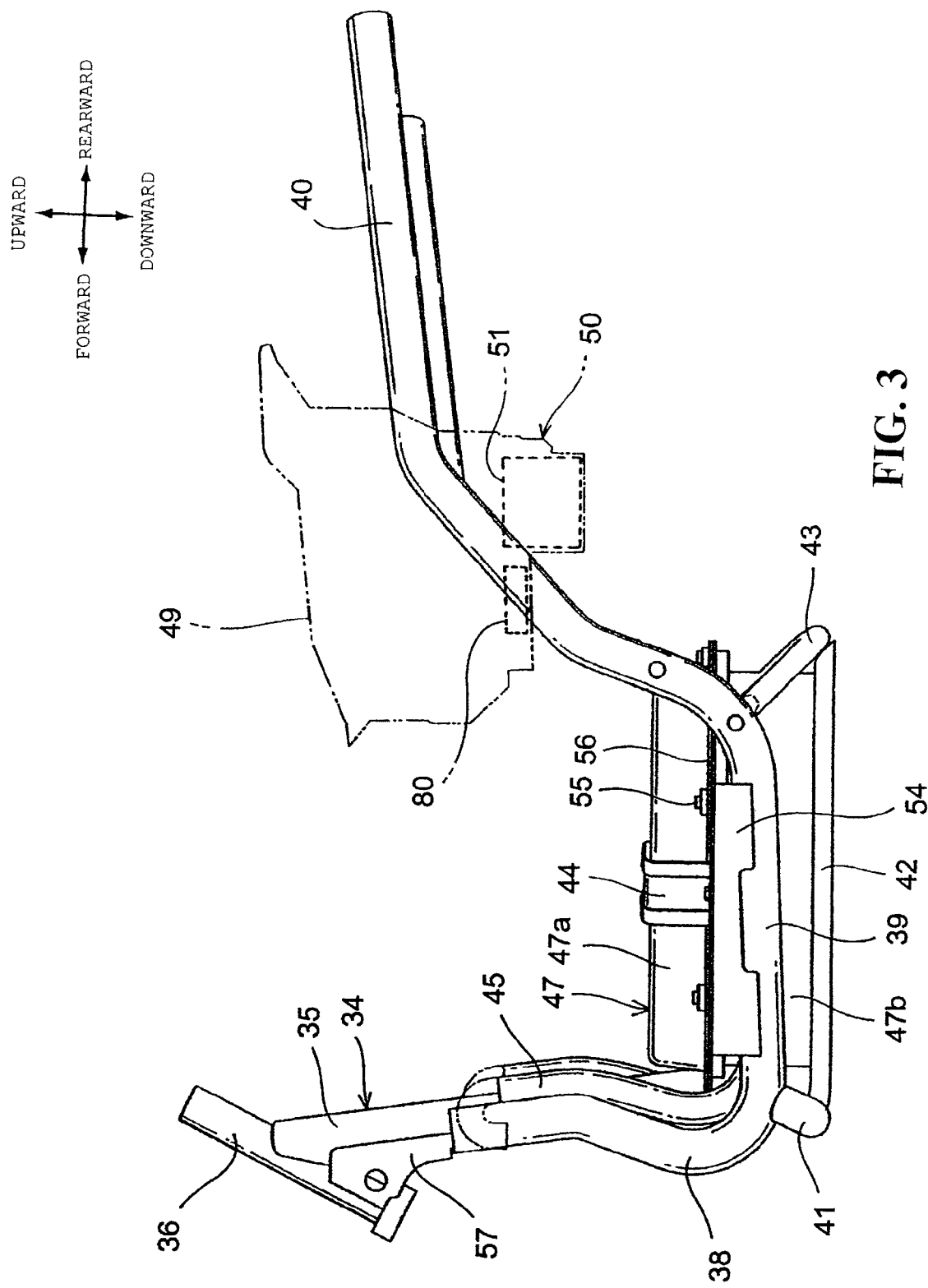
FIG. 3 is a side elevational view of a vehicle body frame.
Figure 4:
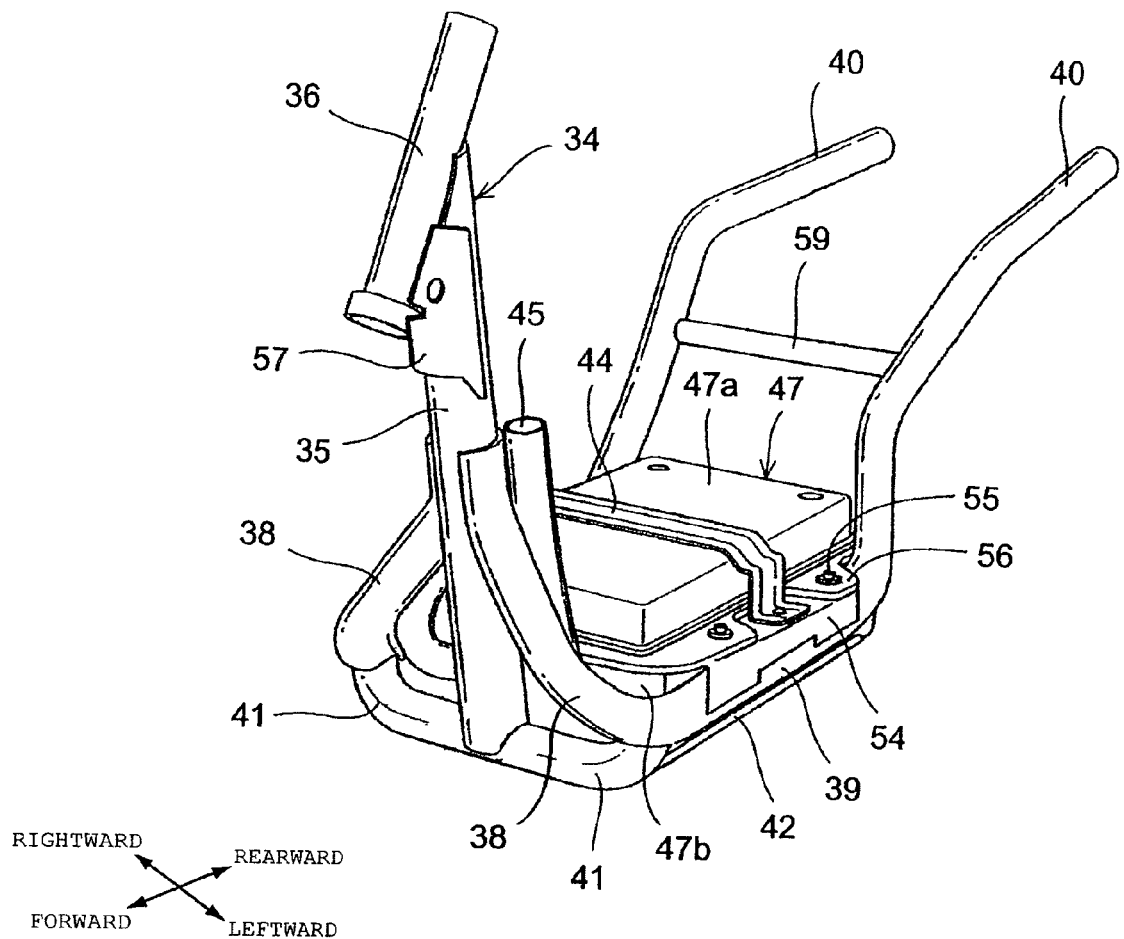
FIG. 4 is a perspective view of the vehicle body frame.

FIGS. 3 and 4 are a side elevational view and a perspective view of the vehicle body frame 34. A gusset 57, which increases the coupling strength between the head pipe 36 and the main frame 35 and functions as an attaching stay for various auxiliaries, is provided at a joining portion of the head pipe 36 and the main frame 35. The main frame 35 extends linearly in a rearwardly downward direction from the head pipe 36 and is connected to the front protective member 41 which extends in the vehicle widthwise direction. The cooling air introduction ducts 45 extend along the main frame 35 in such a manner that they sandwich the main frame 35 from the opposite sides in the leg shield 10. The under frames 39 are formed integrally with the curved portions 38 connected to the left and right in the vehicle widthwise direction of the main frame 35 below the gusset 57. The front protective member 41 is jointed at left and right end portions thereof in the vehicle widthwise direction to the curved portions 38. Further, a first cross pipe 59 extending in the vehicle widthwise direction is disposed between the left and right rear frames 40 rearwardly upwardly of the battery case 37.

It is to be noted that the attaching position of the second speaker can be changed in various manners, and for example, also it is possible to attach the second speaker, for example, between left and right portions of the front protective member 41 at a lower end portion of the main frame 35.

The battery case 47 in which the high voltage battery 48 is accommodated is configured from a case main body 47b of a bottomed box shape, and a lid 47*a* which covers an opening at an upper portion of the case main body 47*b*. A flange portion 56 is formed around a joining plane between the case main body 47*b* and the lid 47*a*.

A side bracket 54 is secured by welding to an upper face of each of the under frames 39. The cross member 44 and the flange portion 56 of the battery case 47 are secured to this side bracket 54. The flange portion 56 is formed bypassing the cross member 44 and is secured to an upper face of the side bracket 54 by bolts 55. The lower protective members 42 for protecting the battery case 47 are provided between the front protective member 41 and the rear protective member 43 and connect the front and rear protective members 41 and 43 to each other.

Figure 5:
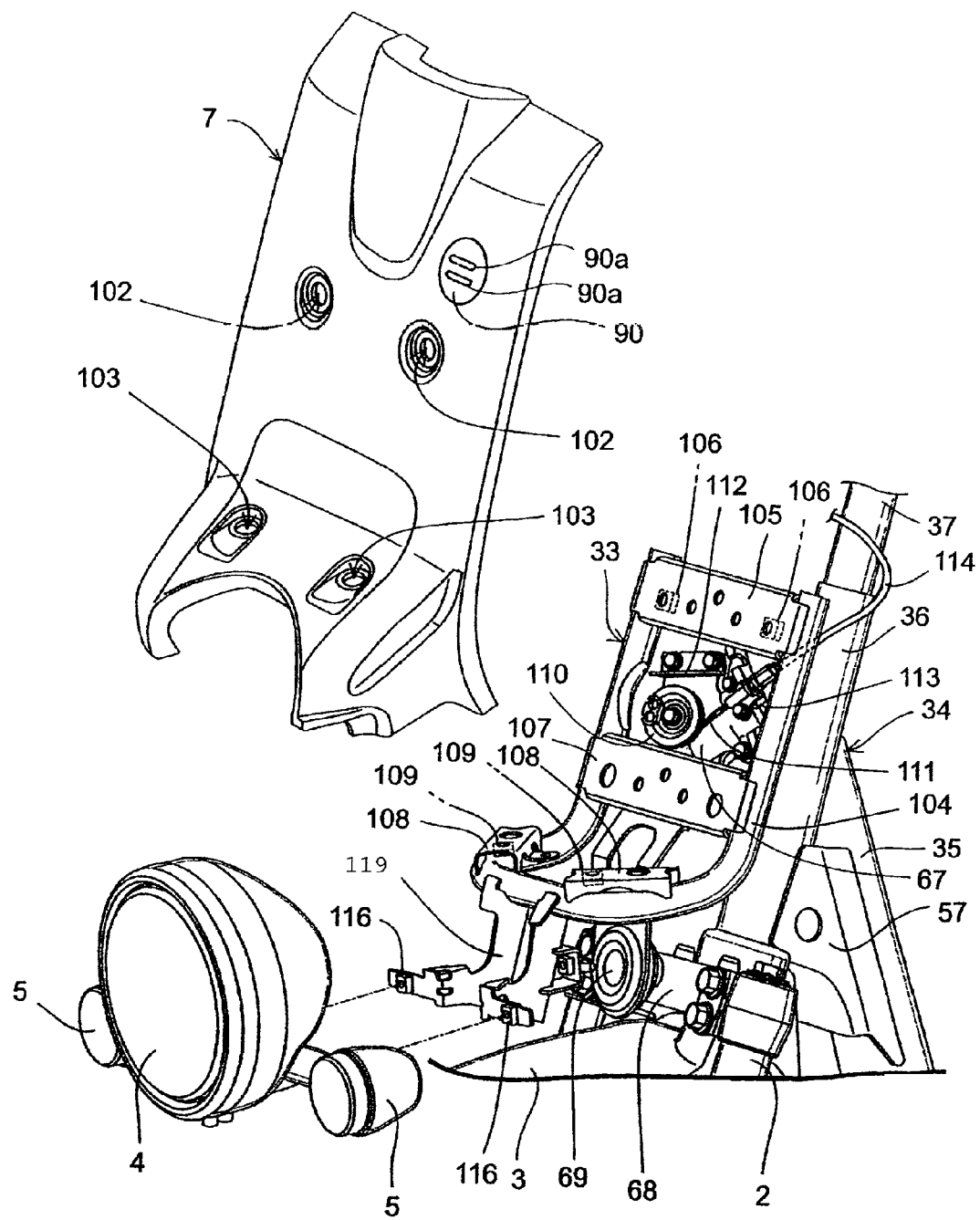
FIG. 5 is an exploded perspective view of a front portion of a head pipe.

FIG. 5 is an exploded perspective view of a front portion of the head pipe 36. Like reference characters to those described hereinabove denote like or equivalent elements. The headlamp 4 and the direction indicators 5 are formed as a unit. The front stay 33 which supports this lamp unit is formed from an upright frame portion 104 disposed so as to have a space in the leftward and rightward direction and disposed forwardly of the head pipe 36 by being formed by bending of a single round pipe material, and an upper side connecting plate 105 and a lower side connecting plate 107 which connect liner portions of the upright frame portion 104 on the left and right to each other. The front stay 33 is secured to the head pipe 36 by a pipe material (not shown) coupled to the rear face side of the upper and lower connecting plates 105 and 107.

A pair of left and right support bases 108 are provided forwardly of a lower portion of the upright frame portion 104 with weld nuts 109 being welded to a lower face of each of the support bases 108. Further, two weld nuts 106 are welded also at two places of the upper side connecting plate 105 spaced from each other on the left and the right. Lower side carrier securing holes 103 are formed at a portion of the front cover 7 which corresponds to the weld nuts 109 of the support bases 108 while upper side carrier securing holes 102 are formed at a portion of the front cover 7 which corresponds to the weld nuts 106 of the upper side connecting plate 105.

The front carrier 6 is secured to the front stay 33 by co-fastening using fastening members fitted in the carrier securing holes 102 and 103. To forward downward portions of the front stay 33 between the left and right support bases 108, headlamp stay 119 for securing the headlamp 4 using a pair of left and right weld nuts 116 are attached.

The electric motorcycle 1 is configured such that a throttle operation is carried out by a turning motion of a throttle grip attached to a right side end portion of the steering handle member 9. In the present embodiment, a sensor main body 67 of a throttle opening sensor for detecting this throttle operation is disposed at a position forwardly of the head pipe 36. A throttle wire 111 connected to the throttle grip is connected at the other end portion thereof to an outer peripheral end portion of a pulley 110 attached for rotation to the sensor main body 67. Consequently, an operational state of the throttle grip can be detected based on the rotational state of the rotary shaft of the pulley 110. The pulley 110 is normally biased in a direction in which the throttle is returned by a torsion coil spring not shown.

A throttle cable 114 including the throttle wire 111 coated with an outer tube is laid from the right side to the left side in the vehicle widthwise direction forwardly of the head pipe 36 and, while being curved, is laid back to the right side and then is secured to a predetermined position by an attaching stay 113. A protective hood 112 for preventing the pulley 110 from contacting with any other part or the like is provided above the pulley 110.

A circular cover member 90 in which two through-slits 90*a* are formed at a portion of an upper portion of the upper side carrier securing hole 102 which corresponds to a position of the speaker 60, which notifies an individual, such as a walker or the like, of the approach of the electric motorcycle 1, forwardly of the vehicle body, and which is displaced leftwardly in the vehicle widthwise direction of the front cover 7. The cover member 90 is removably mounted on the front cover 7.

Figure 6:
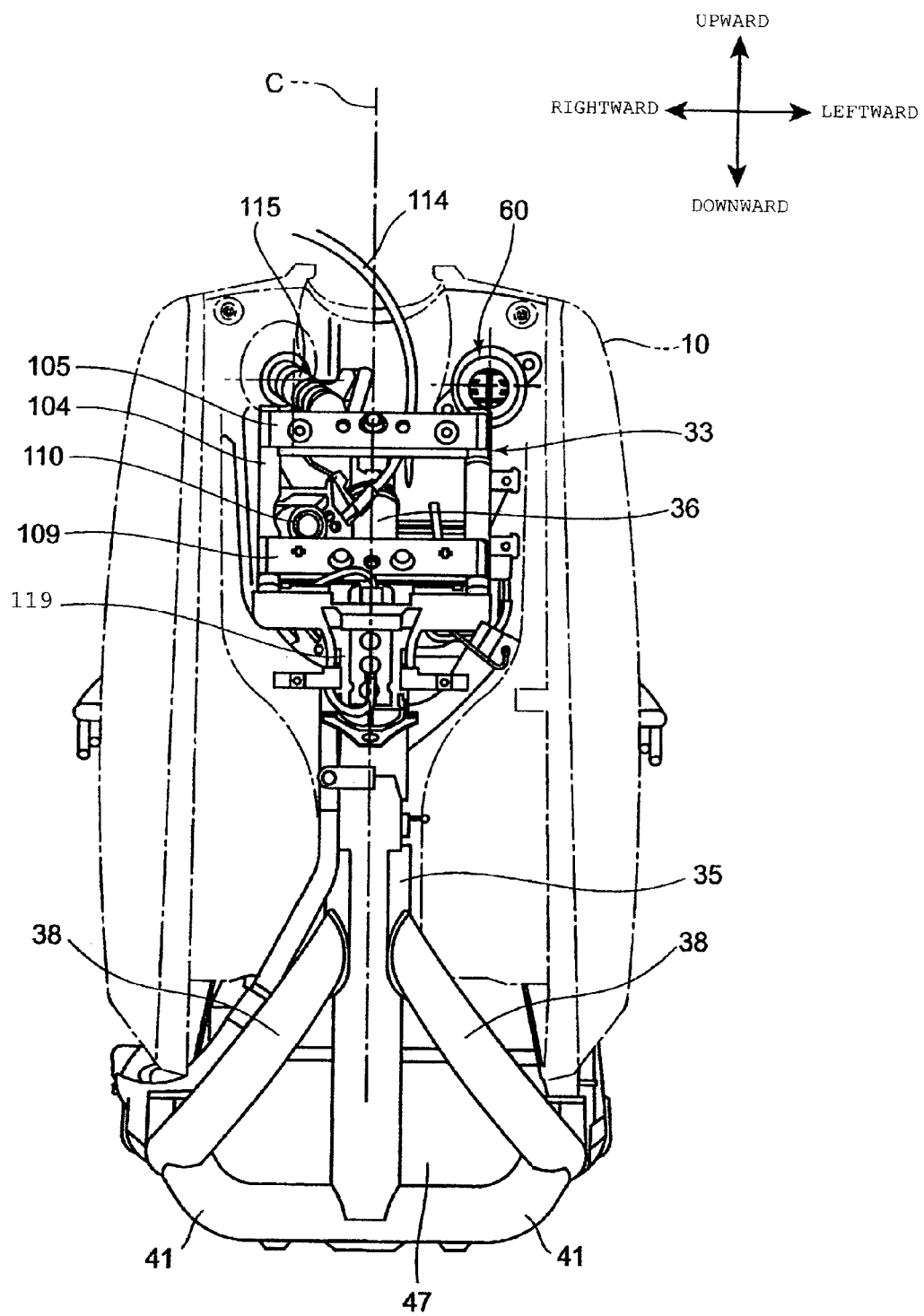
FIG. 6 is a front elevational view of a vehicle body in a state in which a front cover and so forth are removed.

FIG. 6 is a front elevational view of the vehicle body in a state in which the front cover 7 and so forth are removed. Like reference characters to those described hereinabove denote like or equivalent elements. The speaker 60 is disposed in an offset relationship to the vehicle body left side with respect to the head pipe 36 at the center in the vehicle widthwise direction on the face of the leg shield 10 on the vehicle body front side. Meanwhile, on the right side in the vehicle widthwise direction across the head pipe 36, a key cylinder 115 of a main switch is disposed. A keyhole into which a main key (not shown) is to be inserted is formed at one end portion of the key cylinder 115, and this keyhole is exposed to the vehicle body rear side from a through-hole provided in the leg shield 10 (refer to FIG. 12). The speaker 60 and the key cylinder 115 are advantageous in weight balance, threading of a cable or the like and so forth since it is disposed at a substantially equal distance in the vehicle widthwise direction and at a substantially same height with respect to the center of the vehicle body (head pipe center C).

The speaker 60 is disposed so as to be directed forwardly of the vehicle body from an upper portion of the upper side connecting plate 105 of the front stay 33. Since the front carrier 6 (refer to FIG. 2) attached to the front stay 33 is formed in conformity with the height of the front stay 33, a notification sound outputted from the speaker 60 is not disturbed by the front carrier 6 and so forth. Also when the load basket 66 of a large size (refer to FIG. 2) or the like is attached to the front carrier 6, since the speaker 60 is disposed at a position rather near to an upper portion of the load basket 66, even if a baggage is placed in the load basket 66, the possibility that the generated sound may be disturbed is reduced.

The pulley 110 of the throttle opening sensor is disposed below the key cylinder 115 on the right side in the vehicle widthwise direction. The throttle cable 114 is laid from a forward direction of the head pipe 36 past the left side in the vehicle widthwise direction and then to the right side of the vehicle body past the rear of the head pipe 36.

Figures 7A, 7B:
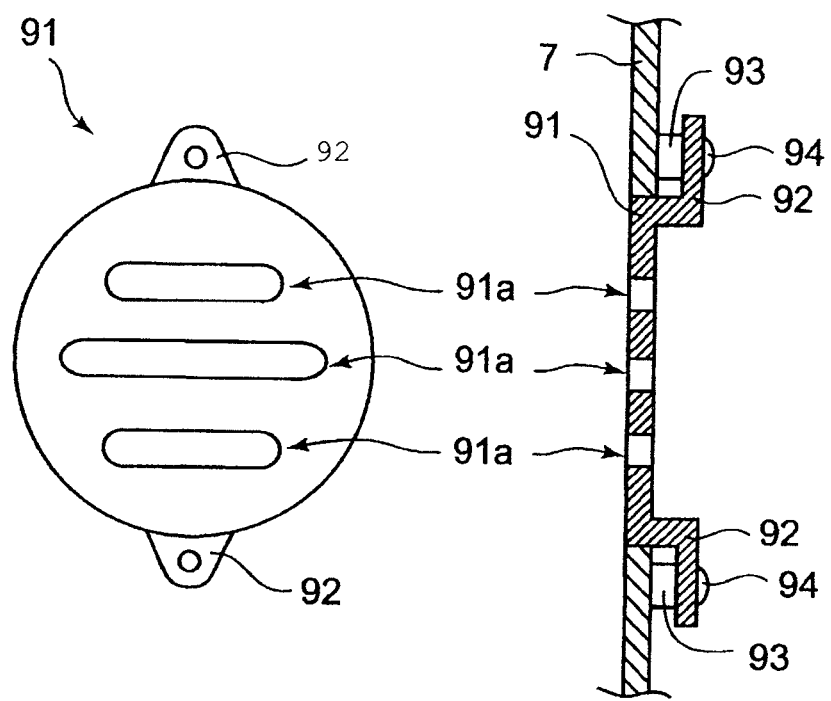
FIG. 7(a) is a front elevational view and 7(b) is a sectional view of a cover member according to a modification to a cover member shown in FIG. 5.

FIG. 7(*a*) is a front elevational view and FIG. 7(*b*) is a sectional view of a cover member 91 according to a modification to the cover member 90 shown in FIG. 5. Three through-slits 91*a* through which a notification sound passes are disposed in the cover member 91. Flanges 92 are provided on an outer peripheral portion of the cover member 91 such that the cover member 91 can be secured to the front cover 7 by screws 94 using bosses 93 provided on the rear face side of the front cover 7. The cover member 91 is configured for removable mounting on the front cover 7. Thus, it is possible to fit cover members of other various shapes in order to carry out sound volume adjustment of a notification sound or design change or to fit, in a vehicle which does not include the speaker 60, with a lid member having no through-slit.

Figure 8A:
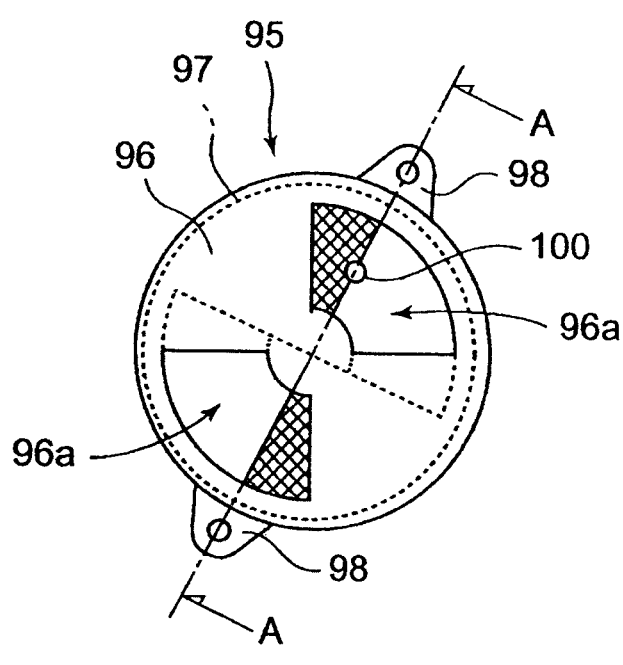
FIG. 8(a) is a front elevational view and 8(b) is a sectional view of a cover member according to a second modification to the cover member shown in FIG. 5.
Figure 8B:
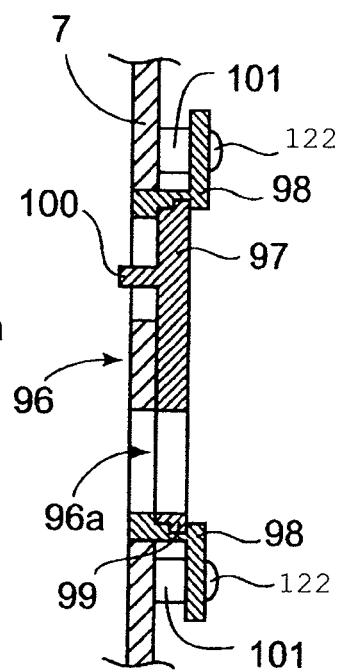

FIG. 8(*a*) is a front elevational view and FIG. 8(*b*) is a sectional view of a cover member 95 according to a second modification to the cover member 90 shown in FIG. 5. The sectional view FIG. 8(*b*) is a sectional view taken along line A-A of the front elevational view FIG. 8(*a*). The cover member 95 is formed from a base member 96 in which window portions 96*a* of a substantially sectoral shape are formed. A rotatable plate 97 is provided for closing up the window portions 96a. The rotatable plate 97 is configured for engaging at an outer circumferential end face 99 thereof with an inner circumferential groove of the base member 96 so as to be rotatable. Consequently, by gripping an operating projection 100 to rotate the rotatable plate 97, the opening area of the window portions 96a can be arbitrarily changed. Flanges 98 are provided on an outer circumferential portion of the cover member 95, and are secured to the front cover 7 by means of screws 122 using bosses 101 provided on the rear face side of the front cover 7.

Figure 9:
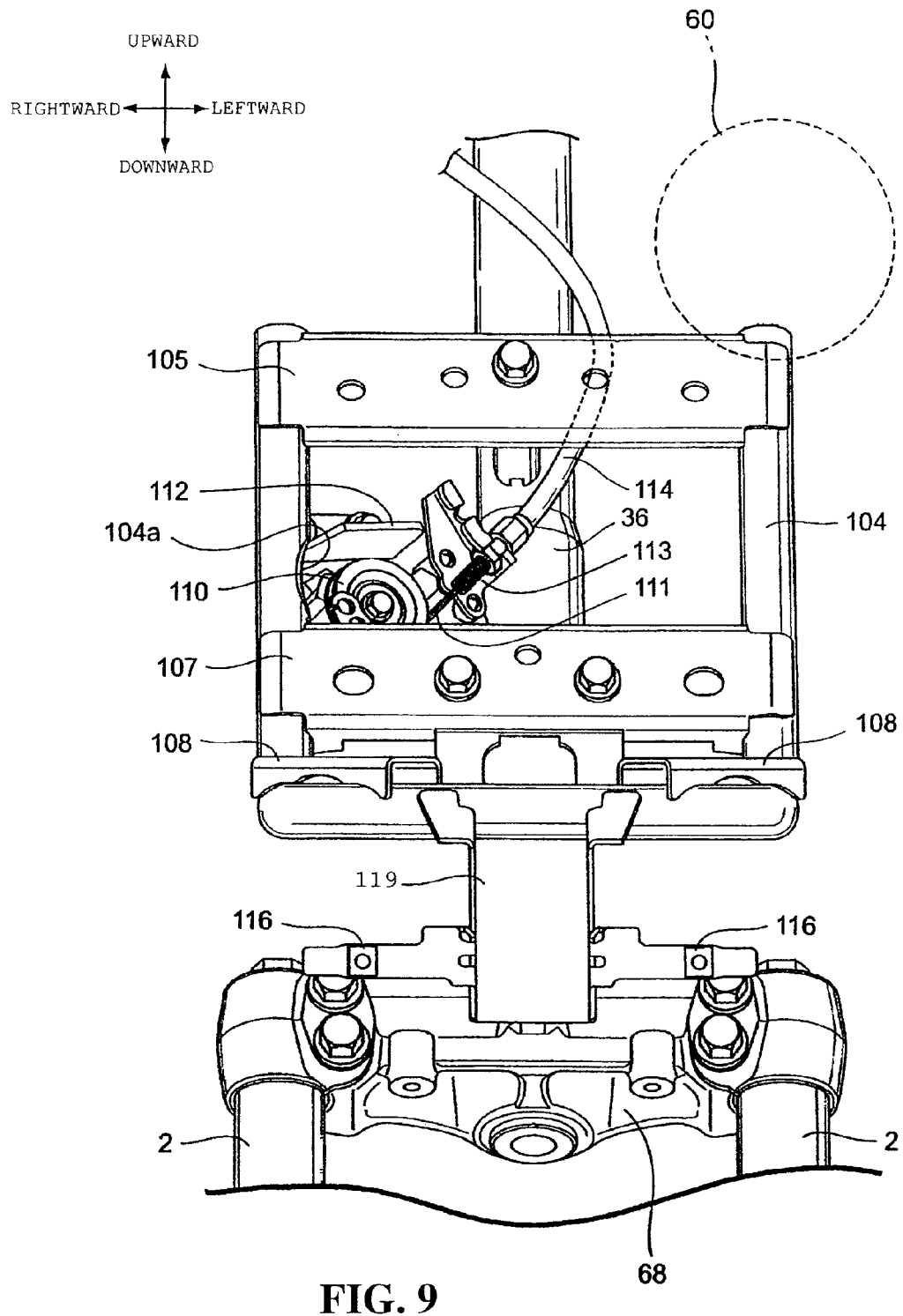
FIG. 9 is an enlarged front elevational view showing a structure around a front stay.

FIG. 9 is an enlarged front elevational view showing a structure around the front stay 33. Like reference characters to those described hereinabove denote like or equivalent elements. The protective hood 112 which covers the pulley 110 from above is inclined such that it assumes a lower position toward the outer side in the vehicle widthwise direction and is disposed at a front end portion thereof forwardly of the vehicle body with respect to the center potion of the pulley 110. The sensor main body 67 (refer to FIG. 5) and the pulley 110 are disposed adjacent the head pipe 36 and rearwardly with respect to the position of a lower end portion of the head pipe 36 as viewed in side elevation of the vehicle body. Further, as viewed in front elevation of the vehicle body, the sensor main body 67 and the pulley 110 are disposed in an offset relationship to the right side in the vehicle widthwise direction from the head pipe 36.

Since the sensor main body 67 and the pulley 110 of the throttle opening sensor are disposed between the upright frame portion 104 of the front stay 33 and the head pipe 36 as viewed in side elevation, even if external force is applied to the front cover 7, the possibility that the sensor main body 67 or the pulley 110 may be influenced by the external force is reduced.

Further, also the taking out direction of the rotary shaft of the pulley 110 or the throttle wire 111 is inclined with respect to the axial direction of the head pipe 36 in conformity with the throttle cable 114 which is disposed in a curved stage forwardly of the head pipe 36. Consequently, the possibility that a turning operation of the steering handle member 9 may have an influence on the sensor output is reduced. While the throttle cable 114 is curved arcuately and passes between the head pipe 36 and the speaker 60, it is guided to the front of the head pipe 36 and is connected to the pulley 110 supported for rotation on the sensor main body 67 of the throttle opening sensor.

Further, with the protective hood 112 provided above the pulley 110, even if a screw or a bolt drops from a fastening location above the head pipe 36 upon assembly, it is possible for the protective hood 112 to receive the dropping article so that it may not have an influence on the rotating operation of the pulley 110. Since the protective hood 112 is inclined outwardly downwardly in the vehicle widthwise direction, the screw, bolt or the like dropping from above can be dropped outwardly in the vehicle widthwise direction, that is, in a direction toward a position at which a smaller number of attachment members exist and water and so forth can be prevented from being accumulated at an upper portion of the protective hood 112.

Further, on a side face portion of the upright frame portion 104 on the right side in the vehicle widthwise direction, a recessed portion 104a for preventing interference between the upright frame portion 104 and the pulley 110 even if the upright frame potion 104 should be moved rearwardly by an action of external force from forwardly is formed.

Figure 10:
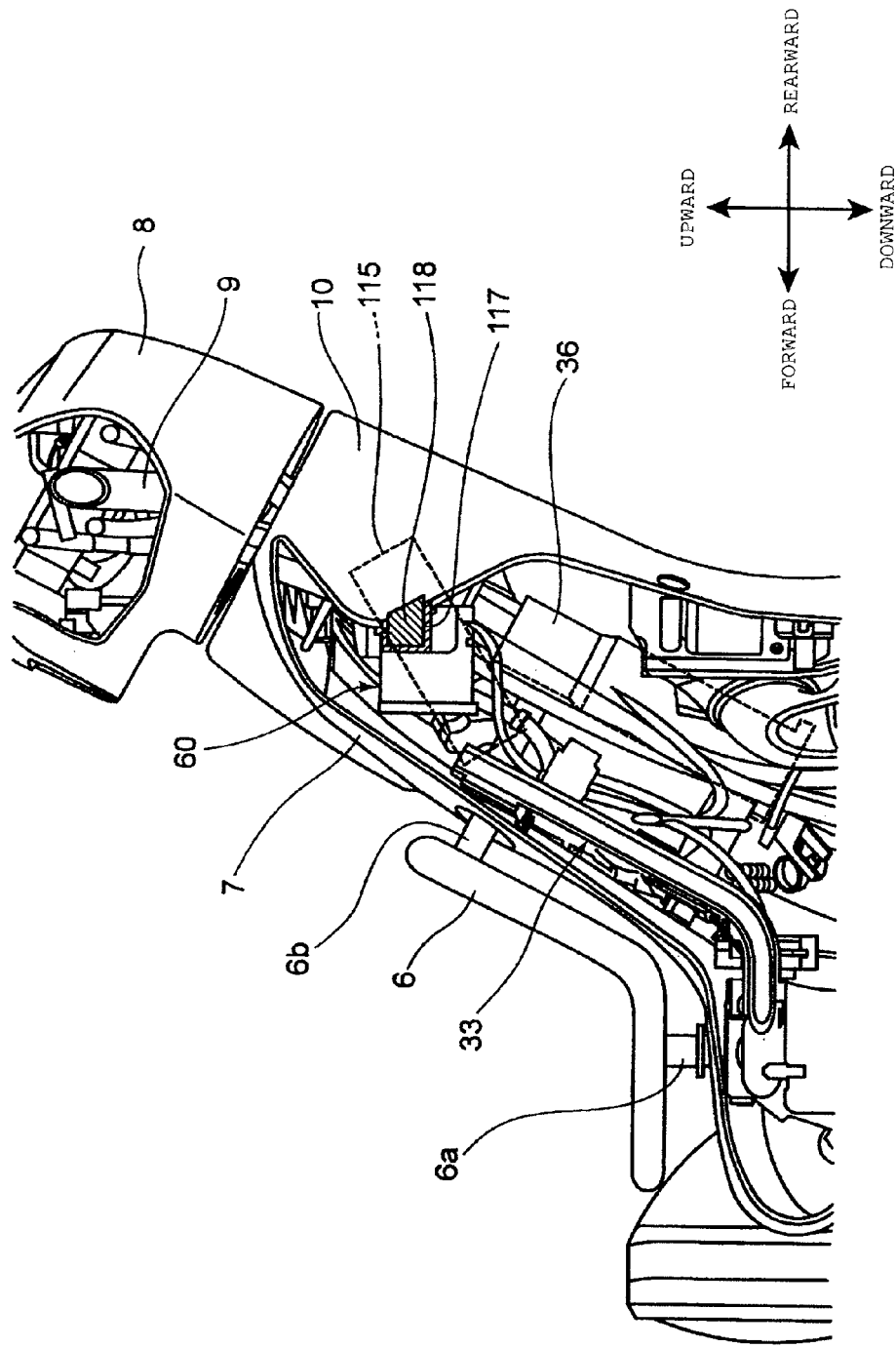
FIG. 10 is a partial sectional side elevational view showing a structure around the head pipe.

FIG. 10 is a partial sectional side elevational view showing a structure around the head pipe 36. The front carrier 6 is secured to the front stay 33 through round pipe stays 6a and 6b. The front carrier 6 can be configured from frame portions which are disposed in a spaced relationship from each other in the leftward and rightward direction by being formed, for example, by bending of a single round pipe material, and a plate-like member which connects liner portions of the frame portions to each other.

As described hereinabove, the speaker 60 which outputs a notification sound is disposed rearwardly upwardly of the front stay 33 on the left side in the vehicle widthwise direction of the head pipe 36. In the present embodiment, a notification sound switch for selecting whether or not a notification sound should be outputted is provided integrally with a rear portion of the speaker 60. A notification sound switch 118 is an on/off switch of the projectable/retractable type which is slidably operated in the forward and backward directions of the vehicle body with respect to a retaining member 117 secured to a wall face of the leg shield 10. An operating element of the notification sound switch 118 is exposed to a face of the leg shield 10 on the vehicle body rear side. The key cylinder 115 and the speaker 60 are disposed forwardly and upwardly of the head pipe 36 in an overlapping relationship with each other as viewed in side elevation of the vehicle body.

Figure 11:
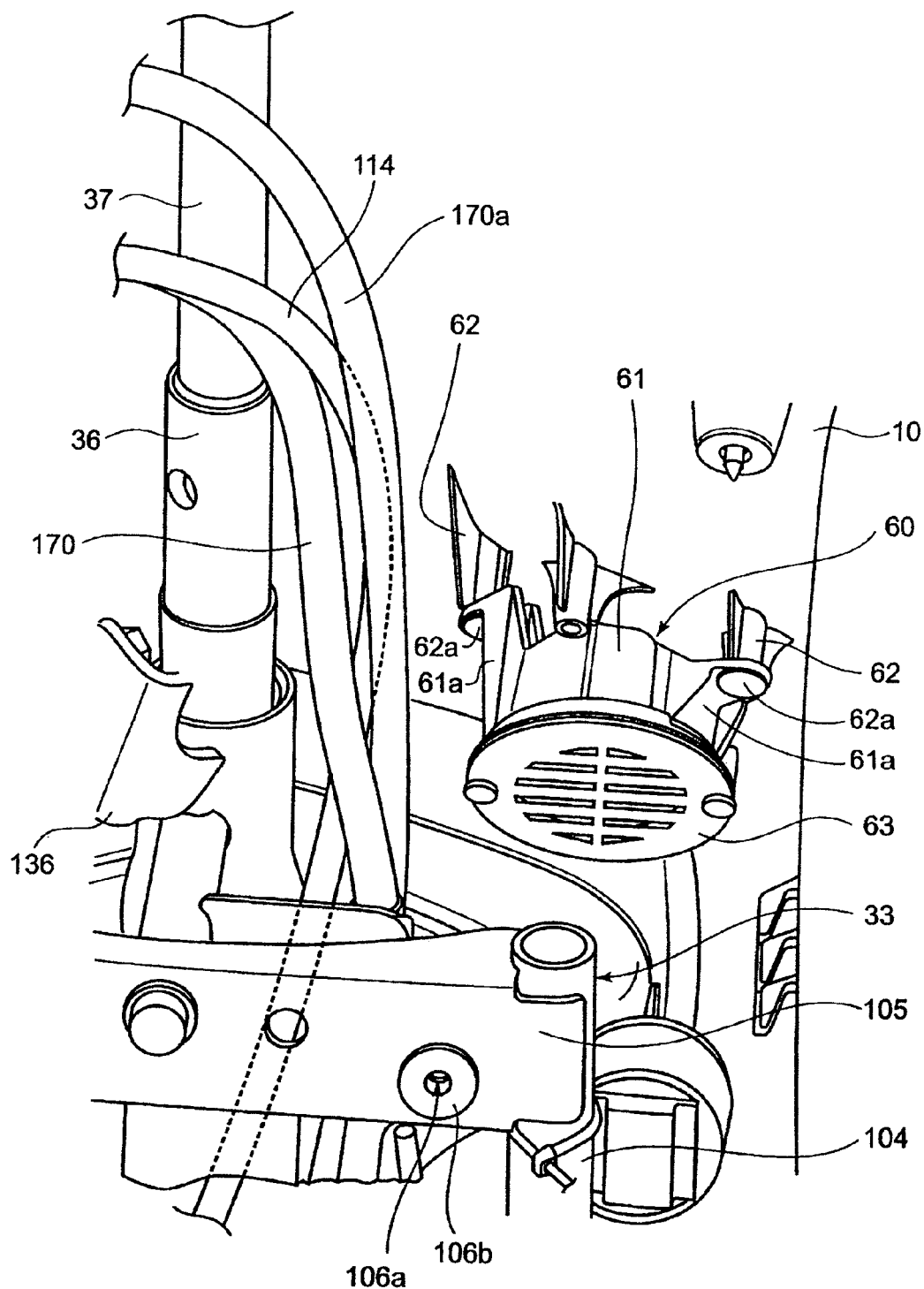
FIG. 11 is a perspective view illustrating an attached state of a speaker.

FIG. 11 is a perspective view illustrating an attached state of the speaker 60. In the speaker 60, a functioning part such as cone paper, a magnet or the like is accommodated between a rear side case 61 and a front side cover 63. The speaker 60 is secured by fastening two flanges 61a formed on the rear side case 61 to bosses 62 formed on the front face of the leg shield 10 by fastening members 62a such as screws.

A harness 170 is laid on the left side in the vehicle widthwise direction of the head pipe 36 such that it extends along the throttle cable 114 which is laid to the front side of the vehicle body past the left side in the vehicle widthwise direction forwardly of the head pipe 36. A front brake cable 170a is laid sidewardly of the harness 170. A damping grommet 106b made of rubber is attached to a position of the upper side connecting plate 105 of the front stay 33 which corresponds to a threaded hole 106a of a weld nut 106 (refer to FIG. 5). It is to be noted that a damping grommet is attached not only to the portion corresponding to the weld nut 106 on the right side in the vehicle widthwise direction but also to a portion corresponding to the weld nuts 109 of the support bases 108 (refer to FIG. 5) of the front stay 33.

Figure 12:
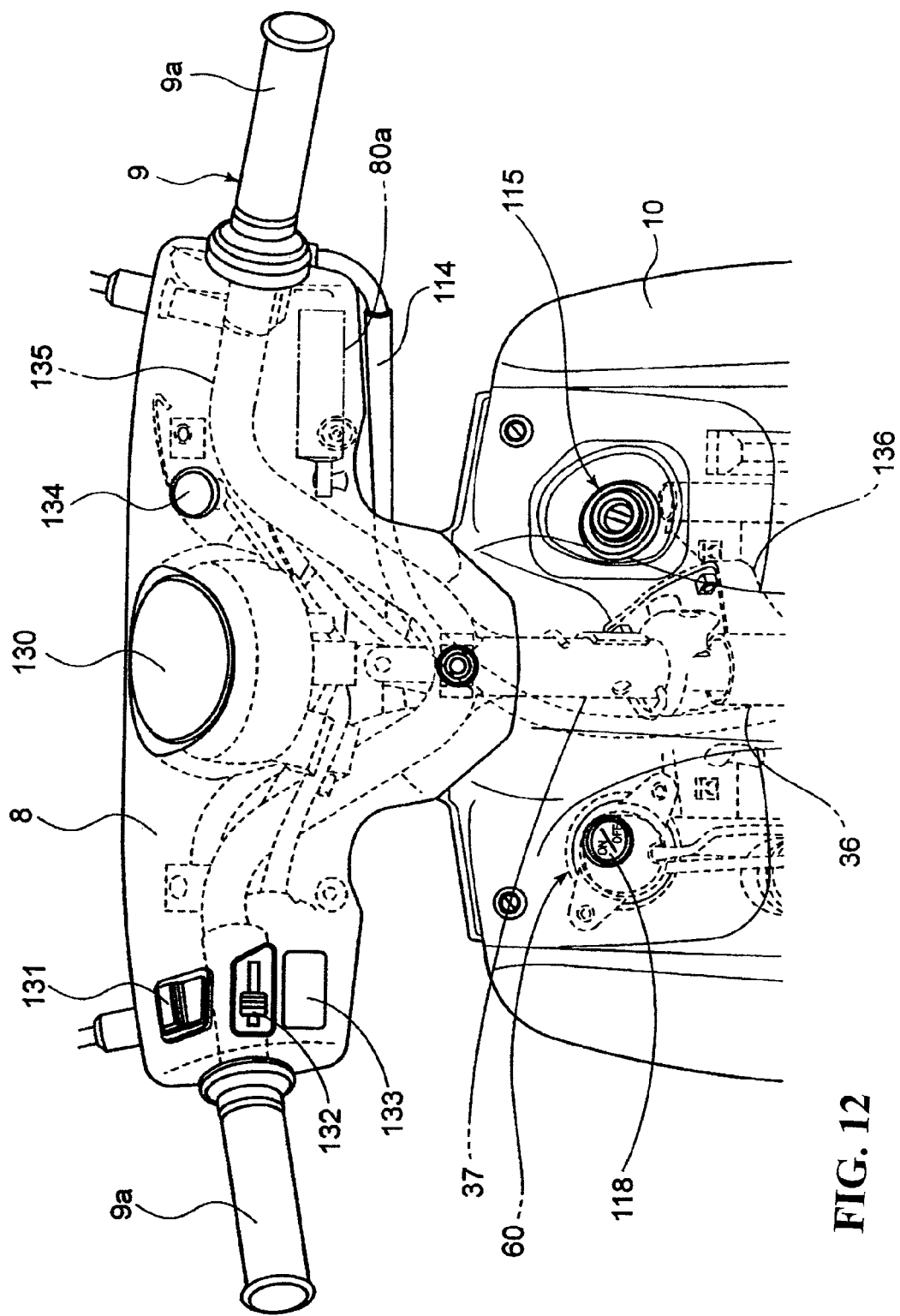
FIG. 12 is a perspective view showing a structure around a steering handle member.

FIG. 12 is a perspective view showing a structure around the steering handle member 9. FIG. 12 corresponds to a state which is overlooked from a point of view of the rider. The steering handle member 9 is formed from a handle pipe 135 fixed to an upper end portion of the steering stem 37 supported for pivotal motion on the head pipe 36, and handle grips 9a secured to the opposite end portions of the handle pipe 135. The handle grip 9a on the right side in the vehicle widthwise direction is supported for rotation with respect to the handle pipe 135 and functions as a throttle apparatus connected to the throttle cable 114.

A meter apparatus 130 for displaying various kinds of information such as a vehicle speed, an accumulated distance and a battery remaining amount is disposed centrally in the vehicle widthwise direction of the handle cover 8. The meter apparatus may be composed of various displays such as liquid crystal display. An operational button 134 for carrying out a changing over operation between an odometer and a trip meter displayed on the meter apparatus 130 and resetting of a trip meter is disposed on the right side in the vehicle width direction.

An optical axis changeover switch 131 for the headlamp 4, an activating switch 132 for the direction indicators 5 and an activating switch 133 for the horn 69 are disposed in order from above on the handle cover 8 in the proximity of the handle grip 9a on the left side in the vehicle widthwise direction.

It is to be noted that, on an ordinary engine vehicle, an engine starter button is disposed in the proximity of the handle grip 9a on the right side. However, on the electric motorcycle 1 according to the present embodiment, a starter button is not required and therefore is not provided, and a free space corresponding to the starter button is provided. A control unit 80a for controlling the output of the speaker 60 may be disposed, utilizing the free space, in the inside of the handle cover 8 below the handle pipe 135 on the right side.

The key cylinder 115 is attached to a stay 136 secured to the right side in the vehicle widthwise direction of the head pipe 36, and a keyhole into which a main key is to be inserted is disposed rearwardly and upwards from a through-hole formed in the leg shield 10. The notification sound switch 118 for the speaker 60 is disposed on the left side in the vehicle widthwise direction across the head pipe 36. It is to be noted that also it is possible to output approach notification sound using the horn 69 for generating an alarming sound or conversely to output an alarming sound using the speaker 60 to reduce the number of parts.

Figure 13:
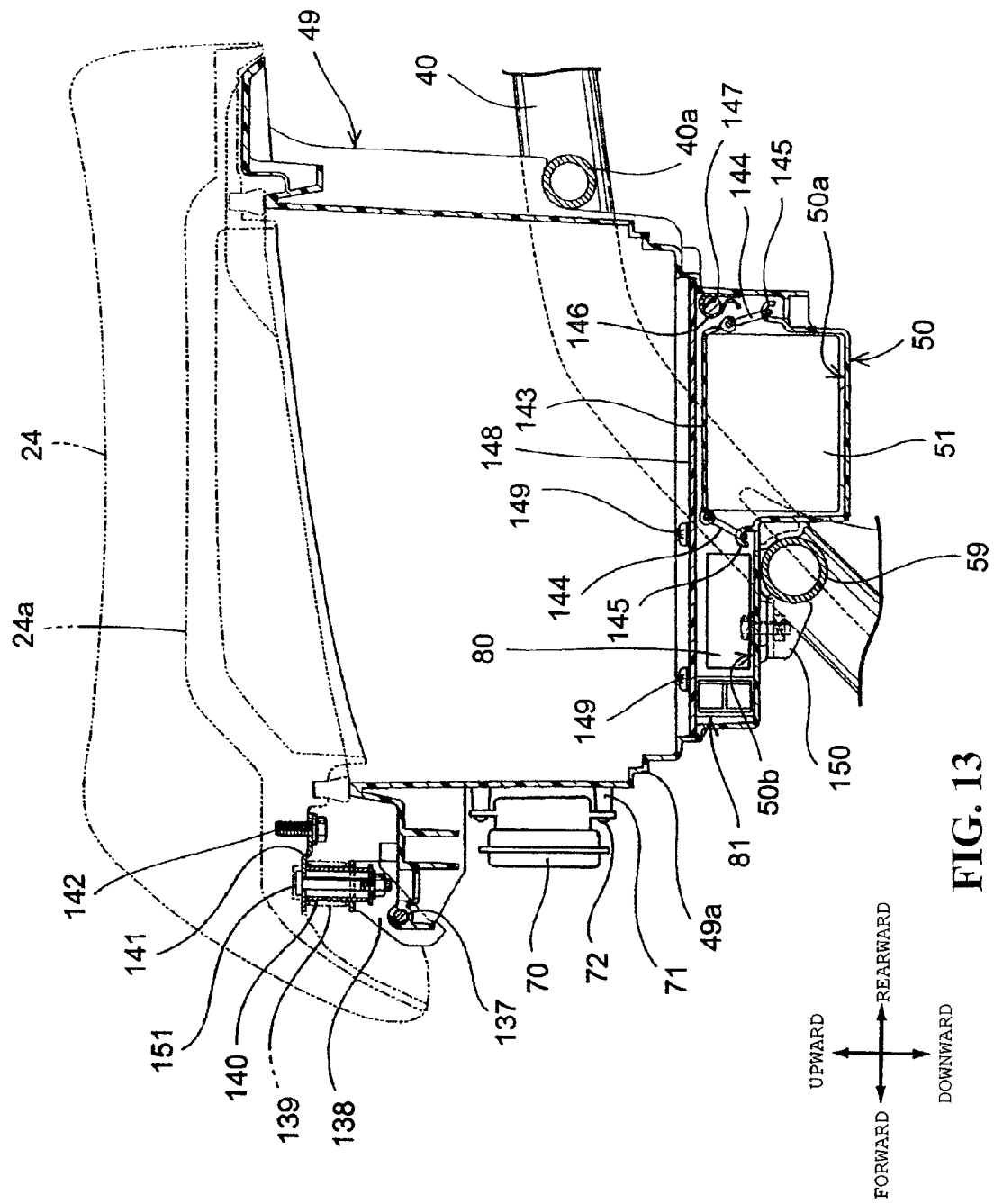
FIG. 13 is a partial sectional side elevational view showing a configuration around an accommodation box.

FIG. 13 is a partial sectional side elevational view showing a configuration around the accommodating box 49. A support shaft 137 directed in the vehicle widthwise direction is disposed at an upper portion of the front end of the accommodating box 49 supported by the pair of left and right rear frames 40 of the vehicle body frame 34. In addition, a supported plate 141 is securely mounted on a lower face of a front portion of a bottom plate 24a of the seat 24 by a pair of bolts 142. Further, a supporting member 138 disposed below the supported plate 141 is supported for pivotal motion on the accommodating box 49 through the support shaft 137. A pair of left and right cylindrical members 140 are secured at an upper end thereof to the supported plate 141 by pins 151, and are fitted at a lower portion thereof for upward and downward sliding movement in the supporting member 138. Coiled springs 139 which surround the cylindrical members 140 are interposed between the supporting member 138 and the supported member 141. A buffering stop mechanism when the seat 24 is opened fully is configured from a slide mechanism which uses the springs 139.

The accommodating recess 50 projecting downwardly is formed on the bottom of the accommodating box 49. The accommodating recess 50 is formed from a battery accommodating recessed portion 50a for principally accommodating the low voltage battery 51 therein. A control unit accommodating recessed portion 50b is provided for principally accommodating the control unit 80 therein. The low voltage battery 51 disposed in the battery accommodating recessed portion 50a is secured to the accommodating box 49 by causing engaging pieces 144 on the opposite ends of a band 143 suspended on an upper face of the low voltage battery 51 to be engaged with hooks 145 fixedly provided on the bottom portion of the accommodating box 49 forwardly and rearwardly of the battery accommodating recessed portion 50a. The low voltage battery 51 is disposed such that a terminal section thereof is positioned upwardly and rearwardly of the vehicle body.

The control unit 80 and the low voltage battery 51 are covered from above with a cover plate 148 removably attached to an upper face of the bottom portion of the accommodating box 49. The cover plate 148 is fastened at four places around the control unit 80 by screw members 149.

The accommodating box 49 is disposed such that it partly overlaps with the rear frame 40 as viewed in side elevation of the vehicle body. The first cross pipe 59 which interconnects the two rear frames 40 in the vehicle widthwise direction is disposed at a height between a lowermost portion of the accommodating recess 50 and the cover plate 148. The control unit 80 is disposed such that it partly overlaps with the rear frame 40 as viewed in side elevation of the vehicle body and overlaps with the first cross pipe 59 as viewed in top plan of the vehicle body. Further, the cover plate 148 is configured such that it covers an upper face of the low voltage battery 51 and the control unit 80 substantially in level with the same. Consequently, a separate independent cover plate for each part becomes unnecessary and besides an accommodation article in the accommodating box can be retained stably.

Stays 150 are securely mounted at two locations of the first cross pipe 59 spaced leftwardly and rightwardly from each other with weld nuts are securely mounted on a lower face of the stays 150. By screwing bolts into the weld nuts from the bottom face side of the control unit accommodating recessed portion 50b, the accommodating box 49 is secured on the front side thereof to the first cross pipe 59. Further, a second cross pipe 40a for connecting the rear frames 40 to each other is disposed rearwardly upwardly of the first cross pipe 59. A stepped engaging portion for engaging with the second cross pipe 40a from above is formed on a rear wall of the accommodating box 49. A clip 146 for securing a main harness 147 is provided on a rear wall of the battery accommodating recessed portion 50a.

A coupler 81 for connecting the harness extending from the control unit 80 to the harness on the vehicle body side is disposed in the neighborhood on the vehicle body front side of the control unit 80 in the control unit accommodating recessed portion 50b.

The second speaker 70 described hereinabove is secured to the vehicle body front side of the accommodating box 49. The second speaker 70 is secured to a central position in the vehicle widthwise direction by fastening members 72 such as bolts using bosses 71 provided on a wall face 49a on the vehicle body front side of the accommodating box 49. A notification sound outputted from the second speaker 70 is outputted first toward the front side of the vehicle body and then reflected leftwardly and rightwardly in the vehicle widthwise directions and rearwardly of the vehicle body by a face of the leg shield 10 on the vehicle body rear side. Further, since the second speaker 70 is attached to the accommodating box 49, an attaching member for exclusive use for the speaker is unnecessary. In addition, the accommodating box 49 serves also as an echo member of the second speaker 70 and a desired sound pressure can be assured by a speaker of a small size.

Figure 14:
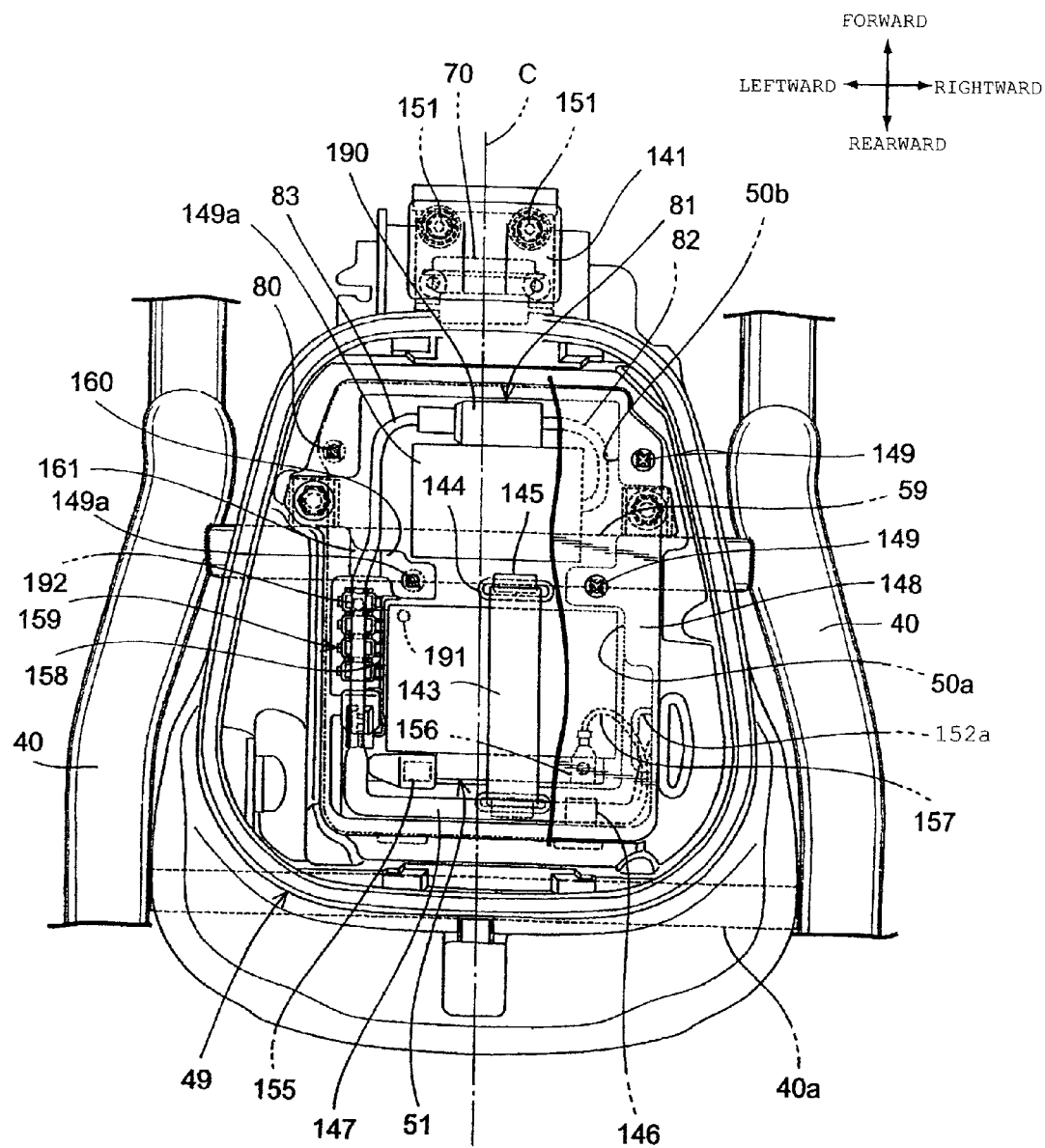
FIG. 14 is a top plan view showing a configuration around the accommodation box.

FIG. 14 is a top plan view showing a configuration around the accommodating box 49. Like reference characters to those described hereinabove denote like or equivalent elements. The low voltage battery 51 accommodated in the battery accommodating recessed portion 50a is disposed such that a positive side terminal 155 and a negative side terminal 156 are positioned rearwardly upwardly of the vehicle body. A power supply line led out from the positive side terminal 155 is taken in the main harness 147 and is laid on one side thereof to the front side of the vehicle body. The other side of the main harness 147 is led out to the outside of the accommodating box 49 from an exit hole 152a formed in the bottom on the right side in the vehicle widthwise direction of the battery accommodating recessed portion 50a in order to supply power to various accessories. Also a ground line led out from the negative side terminal 156 is taken in the main harness 147.

A fuse box 159 is disposed on the left side in the vehicle widthwise direction of the battery accommodating recessed portion 50a. The fuse box 159 is disposed at a position between the bottom of the battery accommodating recessed portion 50a and the bottom of the control unit accommodating recessed portion 50b. A control unit connecting harness 83 led out from the main harness 147 is laid on the front side of the vehicle body in such a manner that it is sandwiched between the fuse box 159 and the cover plate 148 in the upward and downward direction.

A partition plate 158 erected upwardly of the vehicle body is formed between the low voltage battery 51 and the fuse box 159, and the fuse box 159 is secured in such a manner that it is sandwiched between the partition plate 158 and a side wall on the left side in the vehicle widthwise direction of the battery accommodating recessed portion 50a. With the partition plate 158, it is possible to dispose the fuse box 159 in the proximity of the low voltage battery 51 thereby to enhance the maintenance performance and facilitate an operation of mounting and removing the low voltage battery 51 while the fuse box 159 is retained.

A seal face 160 which contacts with the cover plate 148 to exhibit a waterproof property and so forth is provided around a threaded hole 149a into which a screw member 149 for securing the cover plate 148 is to be screwed. At a portion of the seal face 160 on the vehicle body front side of the fuse box 159, a recessed portion 161 is formed for passing the control unit connecting harness 83 therethrough.

A first drain hole 191 for discharging water admitted in the inside of the battery accommodating recessed portion 50a is provided at a position of the bottom of the battery accommodating recessed portion 50a displaced leftwardly in the vehicle widthwise direction and forwardly. Further, a second drain hole 192 is provided also in the bottom between the fuse box 159 and the partition plate 158. Thus, even if water or the like should enter the control unit accommodating recessed portion 50b, it is discharged rapidly through the first drain hole 191 of the battery accommodating recessed portion 50a formed continuously with the control unit accommodating recessed portion 50b at a position lower than the control unit accommodating recessed portion 50b. Further, if water enters the attachment bottom of the fuse box 159, then it can be discharged from the second drain hole 192. It is to be noted that, in the case where the side stand 20 is attached to the right side in the vehicle widthwise direction, the first drain hole 191 can be provided rather near to the right side in the vehicle widthwise direction.

The control unit connecting harness 83 laid to the front side of the vehicle body past an upper portion of the fuse box 159 and the connection harness 82 led out from the control unit 80 are connected to each other by the coupler 81 positioned on the vehicle body front side of the control unit 80. The coupler 81 is covered with a coupler cover 190 made of rubber. In particular, the coupler 81 is disposed in the proximity of the face on the vehicle body front side of the control unit 80, and the control unit connecting harness 83 connected by the connector provided on one end of the connection harness 82 and extending rearwardly past sidewardly of the low voltage battery 51 is led out to the outside of the accommodating box 49 together with a wiring line connecting to the low voltage battery 51. Therefore, the control unit connecting harness 83 can be wired collectively in a high space efficiency in the accommodating box 49.

With such a control box accommodation structure as described above, since the control unit 80 is accommodated in the control unit accommodating recessed portion 50b provided on the bottom of the accommodating box 49, the control unit 80 can be protected effectively against an impact from the outside while an influence of rain and so forth is prevented from being had on the control unit 80. Further, since the control unit 80 is covered from above by a cover plate 84 in the accommodating box 49, placement of some other accommodation article from and into the accommodating box 49 is facilitated. Thus, interference of some other accommodation article with the control unit 80 can be prevented advantageously.

Further, since the low voltage battery 51 is accommodated in the battery accommodating recessed portion 50a connecting to the control unit accommodating recessed portion 50b, the low voltage battery 51 is disposed in the proximity of the control unit 80. Thus, an assurance of the power supply is facilitated and it is made possible to directly connect the control unit 80 to the low voltage battery 51 to achieve an enhancement of the wiring efficiency. Further, since the low voltage battery 51 is disposed such that the terminals 155 and 156 are positioned at an upper portion thereof, even if water or the like should flow into the battery accommodating recessed portion 50a, an influence of the water or the like upon the terminals 155 and 156 can be avoided.

Furthermore, since part of the rear frame 40 and the control unit accommodating recessed portion 50b are disposed in an overlapping relationship with each other as viewed in side elevation and the first cross pipe 59 disposed between a lowermost portion of the battery accommodating recessed portion 50a and the cover plate 148 in the upward and downward direction is provided to extend between the rear frames 40, the control unit accommodating recessed portion 50b is surrounded by the rear frames 40 and the first cross pipe 59. Thus, an influence from the outside can be further suppressed from being had on the control unit 80.

The accommodating box 49 is disposed so as to be positioned at the center of the vehicle body center line C. On the other hand, the control unit 80 and the low voltage battery 51 are disposed in an offset relationship to the right side in the vehicle widthwise direction with respect to the vehicle body center line C in order to correct the position of the center of gravity which is displaced to the left side of the vehicle body because the electric motor M and so forth are built in the arm portion of the swing arm 21 of the cantilever type. Details of the relationship between the dispositional position of the control unit 80 and the low voltage battery 51 and the position of the center of gravity of the vehicle body are hereinafter described.

Figure 15:
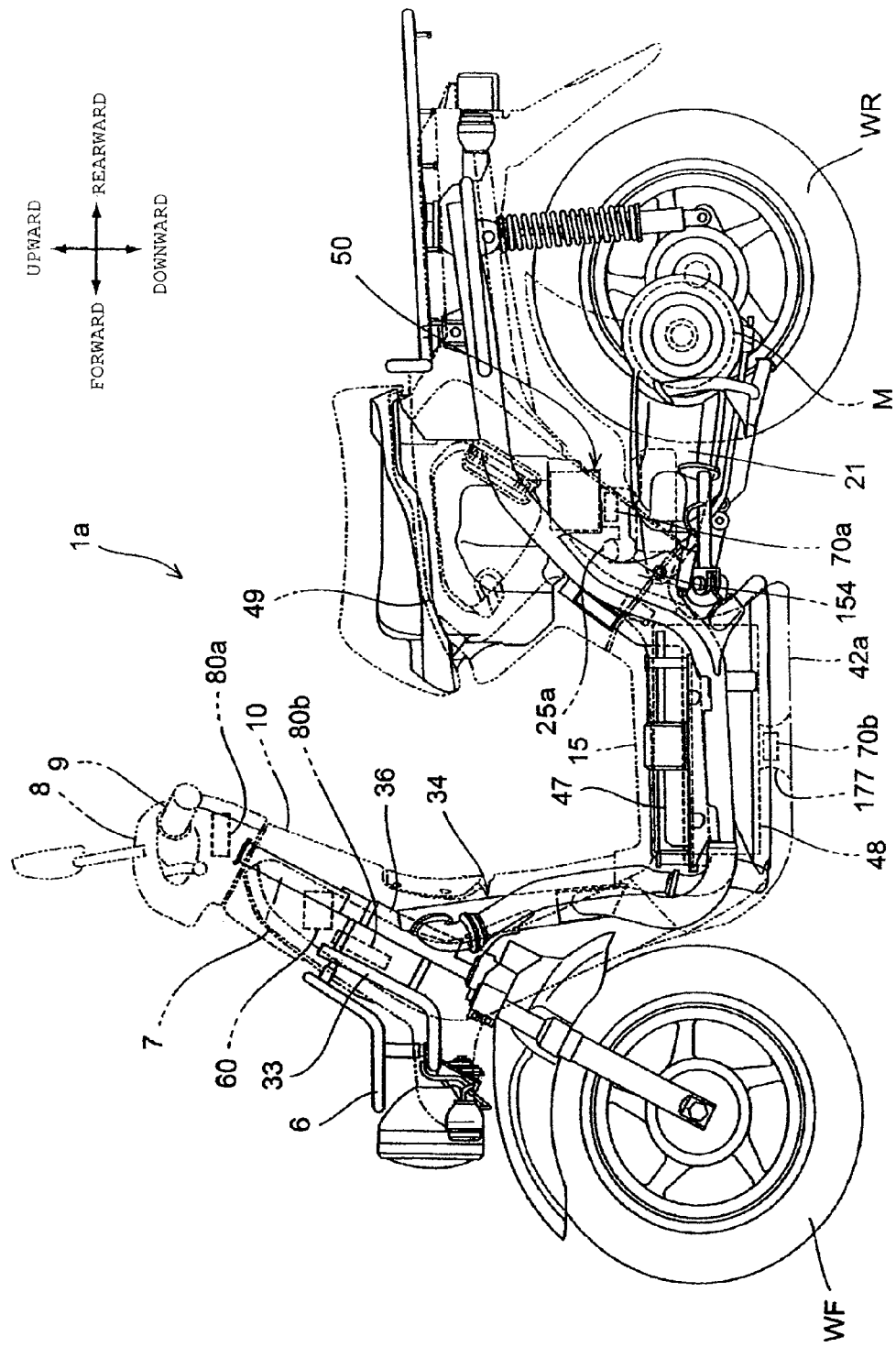
FIG. 15 is a side elevational view of an electric motorcycle to which an approach notification apparatus according to a second embodiment of the present invention is applied.

FIG. 15 is a side elevational view of an electric motorcycle 1a to which an approach notification apparatus according to a second embodiment of the present invention is applied. Like reference characters to those described hereinabove denote like or equivalent elements. The present embodiment is characterized in that the disposition of the second speaker and the control unit is different. Since FIG. 15 is similar to FIG. 1 except the disposition of the second speaker and the control unit, description of similar portions is omitted.

The second speaker 70a is disposed at a lower portion of the accommodating recess 50 projecting downwardly from the accommodating box 49 such that the sound emitting direction is directed downwardly. In this instance, a sound guiding duct 154 for introducing notification sound outputted from the second speaker 70a to a sideward direction of the vehicle body is provided. A notification sound introduced by the sound guiding duct 154 is emitted leftwardly and rightwardly in the vehicle widthwise direction from through-holes 25a formed in the left and right side covers 25 in the vehicle widthwise direction.

Further, as a modification to the dispositional position, the second speaker 70b can be disposed on a lower face of the battery case 47 of the high voltage battery 48 disposed below the low floor 15 such that the sound emitting direction thereof is directed downwardly. In this instance, a sound guiding duct 177 of a megaphone shape or a horn shape for diffusing notification sound outputted from the second speaker 70b is provided. The sound guiding duct 177 is configured such that the lower face thereof is positioned substantially flush with the lower face of an undercover 42a.

In addition, the control unit 80a can be disposed in the inside of the handle cover 8 below the right side handle pipe 135 utilizing a free space assured because a starter button for an engine becomes unnecessary. Further, the control unit 80b can be disposed at a position on the rear face side of the front stay 33 below the speaker 60.

Figure 16:
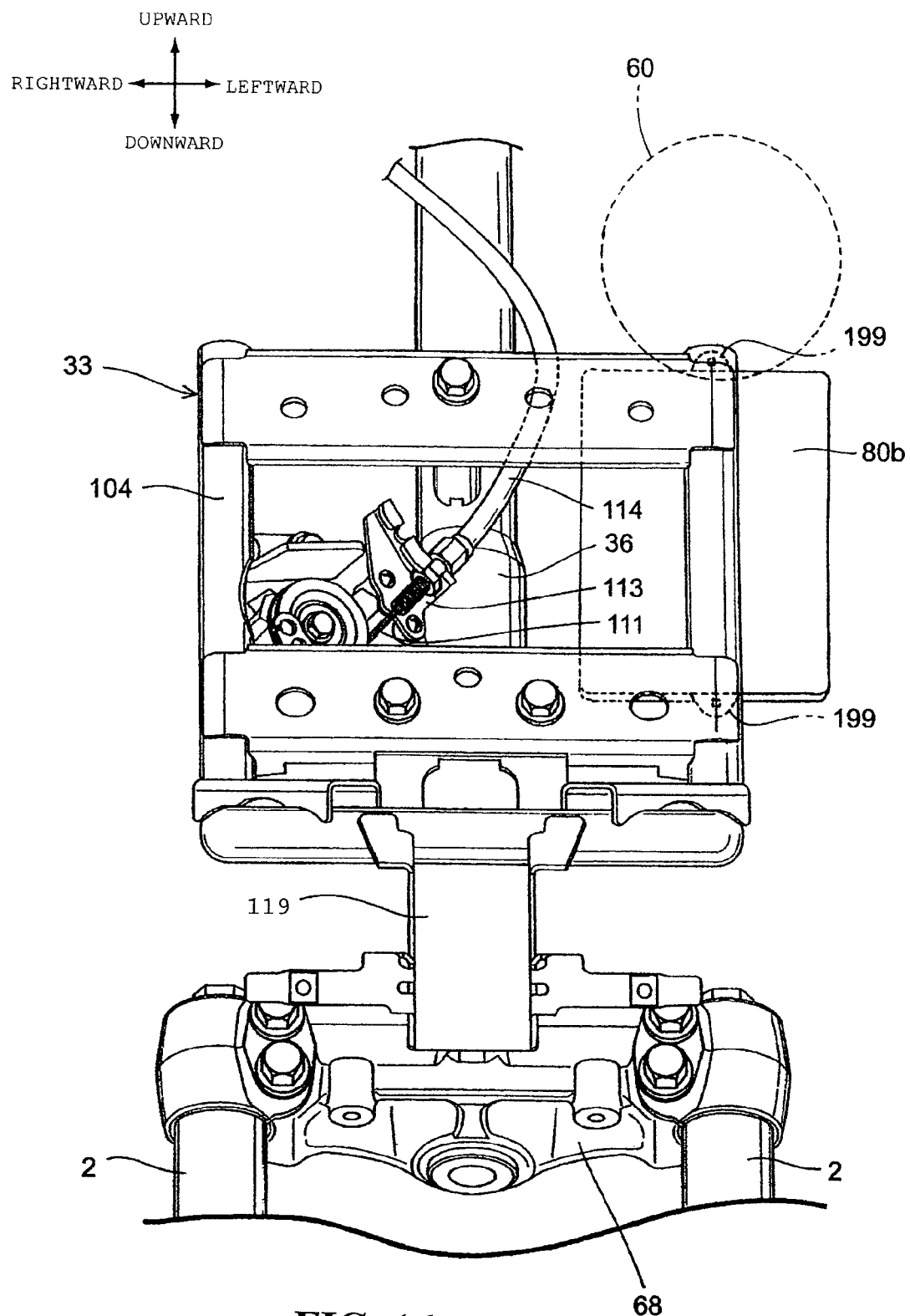
FIG. 16 is an enlarged front elevational view around a front stay according to the second embodiment of the present invention.

FIG. 16 is an enlarged front elevational view around the front stay 33 according to the second embodiment of the present invention. Like reference characters to those described hereinabove denote like or equivalent elements. This figure shows an attachment structure of the control unit 80b disposed at a position on the rear face side of the front stay 33 below the speaker 60. Since FIG. 16 is similar to FIG. 9 except the attachment structure of the control unit 80b, a description of similar portions is omitted.

The control unit 80b can be secured to the upright frame portion 104 on the right side in the vehicle widthwise direction of the front stay 33 utilizing flanges 199 formed at upper and lower end portions thereof According to such an attachment structure as just described, also when external force is applied to the front carrier 6 or the like, the external force can be prevented from having an influence on the control unit 80b. Further, since the speaker 60 and the control unit 80b are disposed in the proximity of each other, in the case where the approach notification apparatus is set as an optional part, an attaching operation of the approach notification apparatus to the vehicle body can be carried out at a time only by removing the front cover 7. Further, with this disposition, also it is possible to form the speaker 60 and the control unit 80b as a unitary part to further simplify the attaching operation of the approach notification apparatus.

Figure 17:
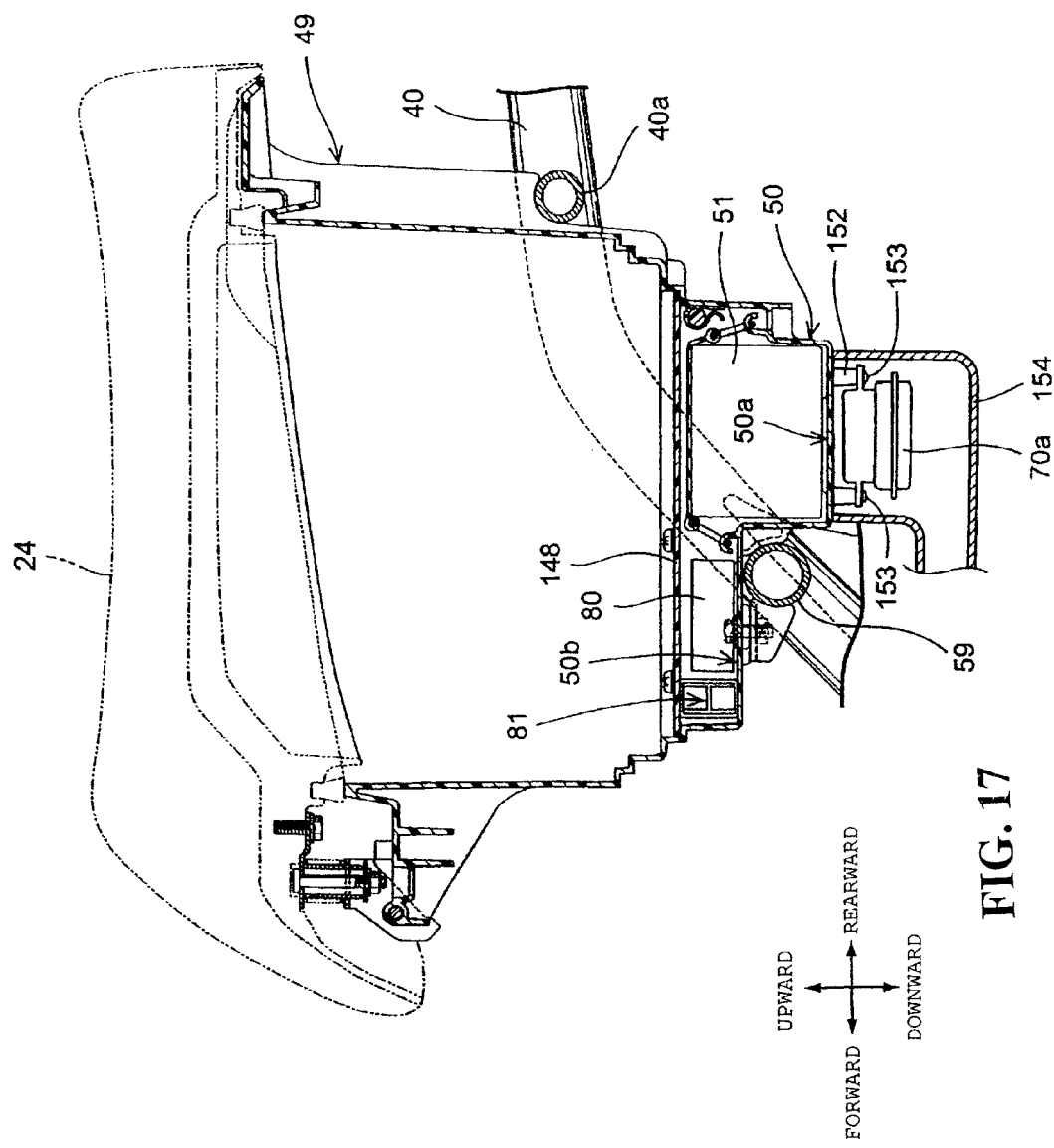
FIG. 17 is a partial sectional side elevational view showing a configuration around an accommodation box according to the second embodiment of the present invention.

FIG. 17 is a partial sectional side elevational view showing a configuration around the accommodating box 49 according to the second embodiment of the present invention. Like reference characters to those described hereinabove denote like or equivalent elements. This figure shows an attachment structure of the second speaker 70a disposed at a lower portion of the accommodating recess 50 projecting downwardly from the accommodating box 49 such that the sound emitting direction thereof is directed downwardly. Since FIG. 17 is similar to FIG. 13 except the attaching structure of the second speaker 70a, description of similar portions is omitted.

In the present embodiment, the second speaker 70a is attached using bosses 152 formed on a lower face of the battery accommodating recessed portion 50a and screw members 153 such that the sound emitting direction thereof is directed downwardly of the vehicle body. The second speaker 70a is disposed at the center in the vehicle widthwise direction, and the sound guiding duct 154 for guiding notification sound outputted from the second speaker 70a to a sideward direction of the vehicle body is provided.

Figure 18:
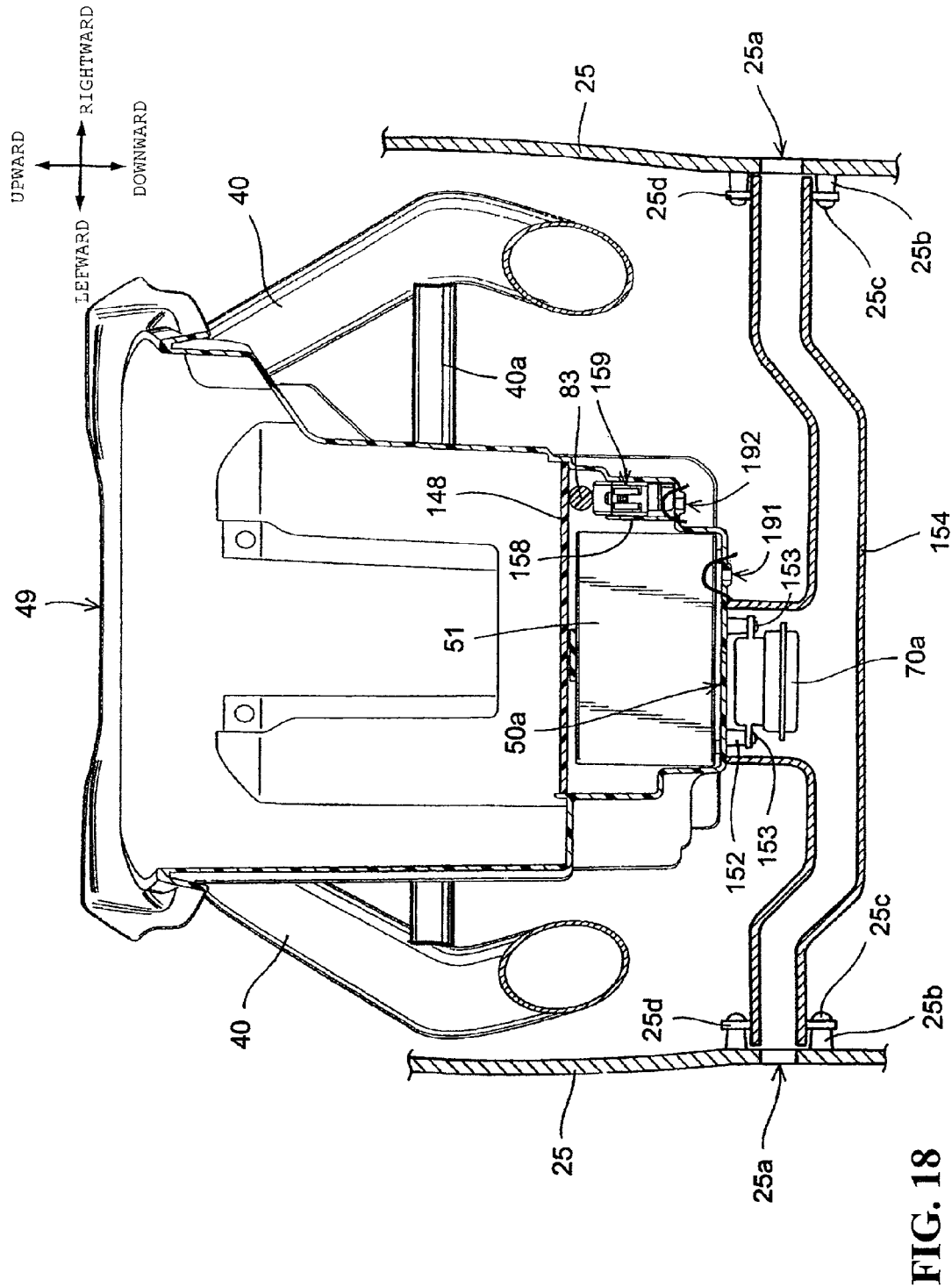
FIG. 18 is a partial sectional side elevational view showing a configuration around the accommodation box according to the second embodiment of the present invention.
Figure 19:
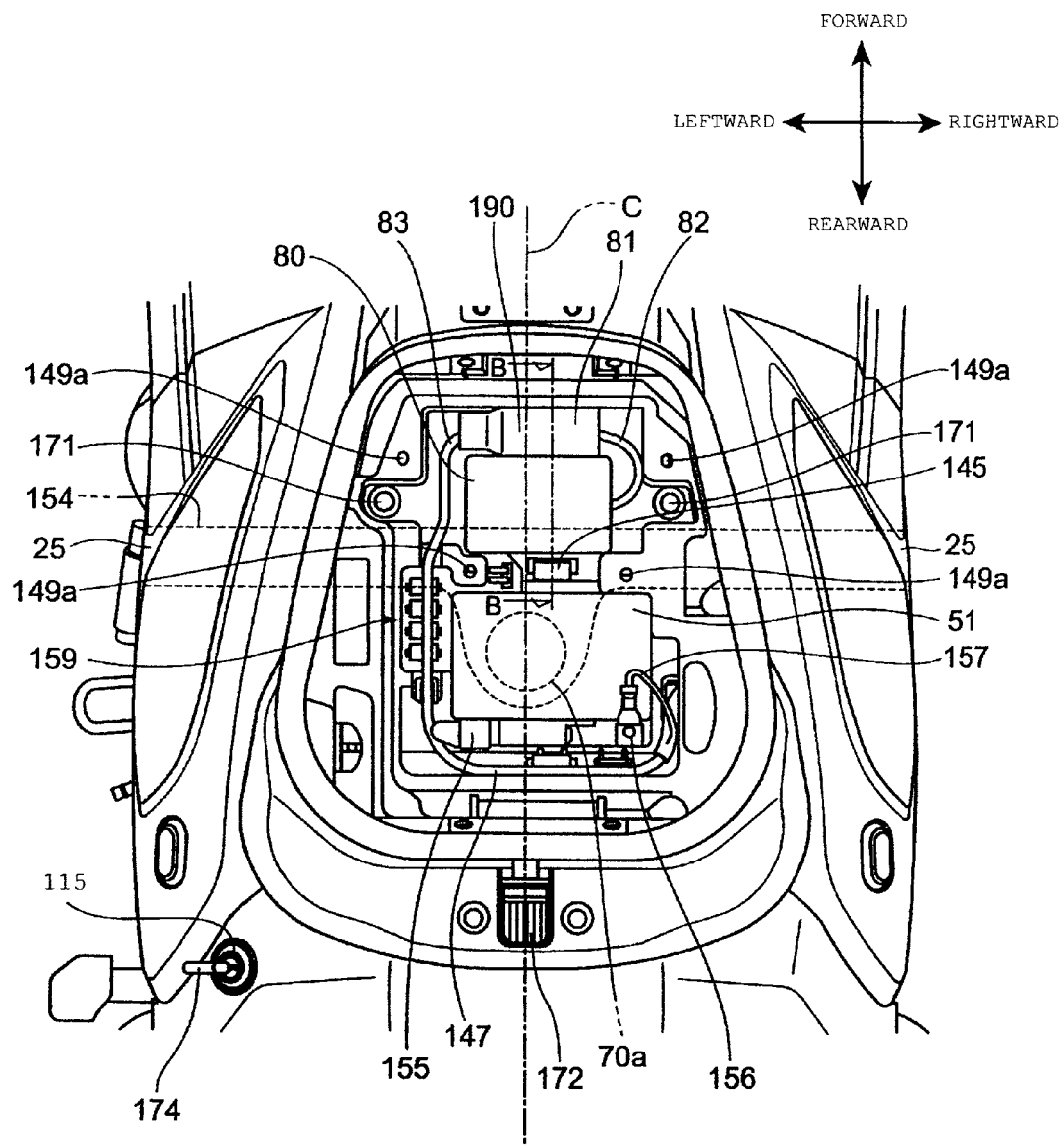
FIG. 19 is a top plan view showing a configuration around the accommodation box according to the second embodiment of the present invention.

FIGS. 18 and 19 are a partial sectional front elevational view and a top plan view showing a configuration around the accommodating box 49 according to the second embodiment of the present invention. Like reference characters to those described hereinabove denote like or equivalent elements.

The second speaker 70a is attached to a lower face of the battery accommodating recessed portion 50a.

The sound guiding duct 154 formed from a pipe-like member is provided around the second speaker 70a, and a notification sound outputted from the second speaker 70a is introduced in the leftward and rightward directions of the vehicle though the sound guiding duct 154 and emitted sidewardly of the vehicle body from a through-hole 25a formed in each of a pair of left and right side covers 25 disposed at a lower portion of the seat 24. A flange 25d is formed at each of end portions of the sound guiding duct 154, and the flanges 25d and the side covers 25 are secured to each other using bosses 25b formed on the rear face side of the side covers 25 and screw members 25c.

With such an attachment structure for the second speaker 70a as described above, the second speaker 70a is attached making use of a dead space which is a lower portion of the battery accommodating recessed portion 50a and it is possible to emit a notification sound from the second speaker 70a in the leftward and rightward directions of the vehicle body. Further, with such a sound guiding duct 157 as described above, since the sound emitting direction of the second speaker 70a can be changed arbitrarily, the degree of freedom in disposition of the second speaker is enhanced.

Referring to FIG. 19, on the side covers 25 on the left side in the vehicle widthwise direction, a key cylinder 115 for unlocking the seat 24 by a turning operation of a main key 174 is disposed. A lock mechanism 172 provided at a rear end of the accommodating box 49 is configured such that, if the main key 174 is turned, then the lock mechanism 172 releases a hook (not shown) secured to a lower face of the seat 24. FIG. 19 illustrates a state in which the cover plate 148 attached to an upper portion of the low voltage battery 51 is removed. Around each of screw members 171 for securing the accommodating box 49 to the first cross pipe 59 (refer to FIG. 17), a portion around the threaded hole 149a for attaching the cover plate 148 is formed in a flat shape so that it can contact closely with the cover plate 148 thereby to exhibit a sealing property.

Figure 20:
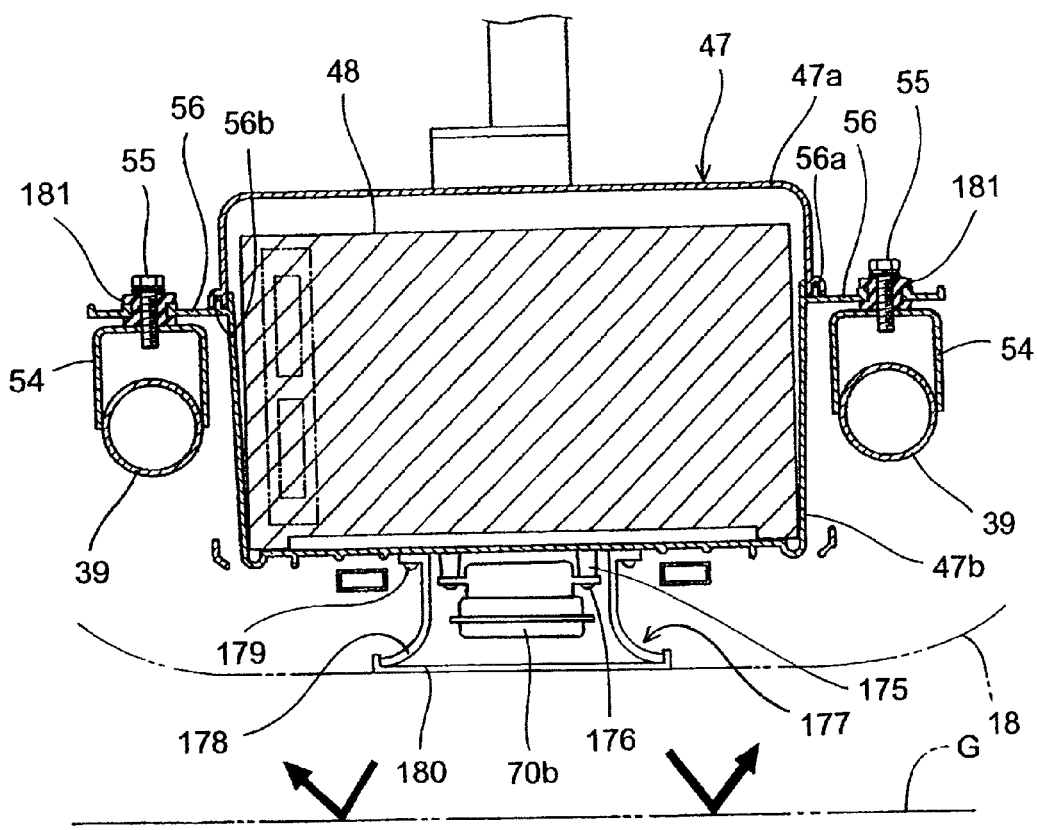
FIG. 20 is a partial sectional front elevational view showing a configuration around a battery case according to the second embodiment of the present invention.

FIG. 20 is a partial sectional front elevational view showing a configuration around a battery case 47 according to a modification to the second embodiment of the present invention. Like reference characters to those described hereinabove denote like or equivalent elements. FIG. 20 shows a section of the battery case 47 as viewed from a forward direction of the vehicle body. A fitting rib 56a is formed on a circumferential edge of an upper opening of the case main body 47b, and a fitting groove 56b is formed on an opening edge of the lid 47a. By fitting them with each other, water immersion from the joining portion between the case main body 47b and the lid 47a is prevented thereby to assure a watertight property. It is to be noted that the flange portion 56 formed on the circumferential edge of the opening of the case main body 47b is secured to the side bracket 54 by bolts 55.

In the present modification, the second speaker 70b is attached using bosses 175 formed on the bottom face of the case main body 47b and screw members 176 such that the sound emitting direction thereof is directed downwardly of the vehicle body. The second speaker 70b is disposed substantially centrally in the vehicle widthwise direction at a position near to the road surface G, and the sound guiding duct 177 of a megaphone shape or a horn shape is disposed around the second speaker 70b. The sound guiding duct 177 is formed from a tubular member 178 secured to the bottom face of the case main body 47b by screw members 179 and formed such that the opening area thereof increases toward a downward direction, and a net plate 180 for reducing the influence of sand and so forth upon the second speaker 70b.

With the disposition of the second speaker 70b described above, the second speaker 70b can be attached making effective use of a dead space which is a lower portion of the battery case 47. Further, since the sound guiding duct 177 of a horn shape is used, sound emitted toward the ground face can be diffused widely together with reflection by the road surface. Furthermore, the battery case 47 having a wide bottom face serves as a good plane of vibration, and a sufficient sound emitting function can be obtained even by a small-sized speaker.

Figure 21:
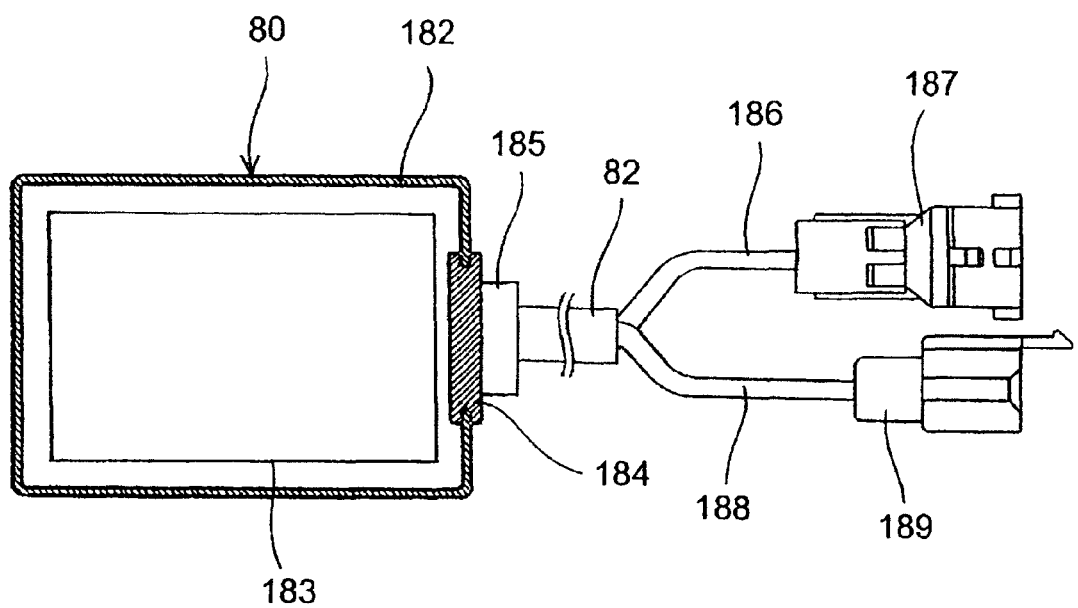
FIG. 21 is a partial sectional top plan view of a control unit.

FIG. 21 is a partial sectional top plan view of the control unit 80. The control unit 80 is configured such that a wiring board 185 is attached to a case 182, in which a control board 183 is accommodated, through a waterproof grommet 184. The connection harness 82 connected to the control board 183 extends through the wiring board 185. The connection harness 82 is formed from a first wiring line 186 to which a first coupler 187 is connected, and a second wiring line 188 to which a second coupler 189 is connected.

Figure 22:
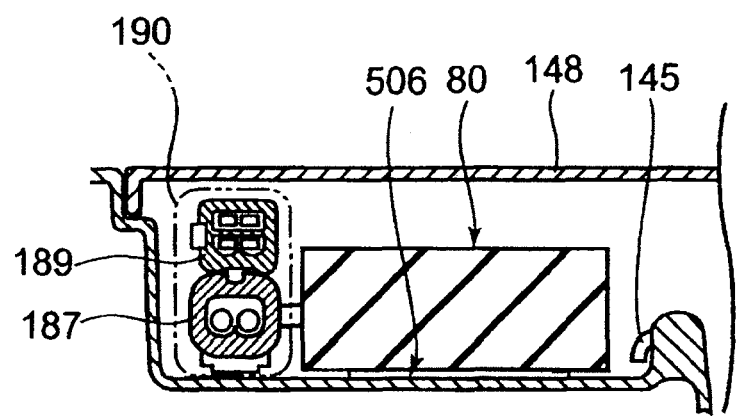
FIG. 22 is a sectional view taken along line B-B of FIG. 19.

FIG. 22 is a sectional view taken along line B-B of FIG. 19. The first coupler 187 and the second coupler 189 are disposed such that they overlap with each other in the upward and downward direction at a position forwardly of the vehicle body with respect to the control unit 80. And, the first coupler 187 and the second coupler 189 are covered with the single coupler cover 190. It is to be noted that, in the present embodiment, a two-pin type part is used for the first coupler 187 and a four-pin type part is used for the second coupler 189.

Figure 23:
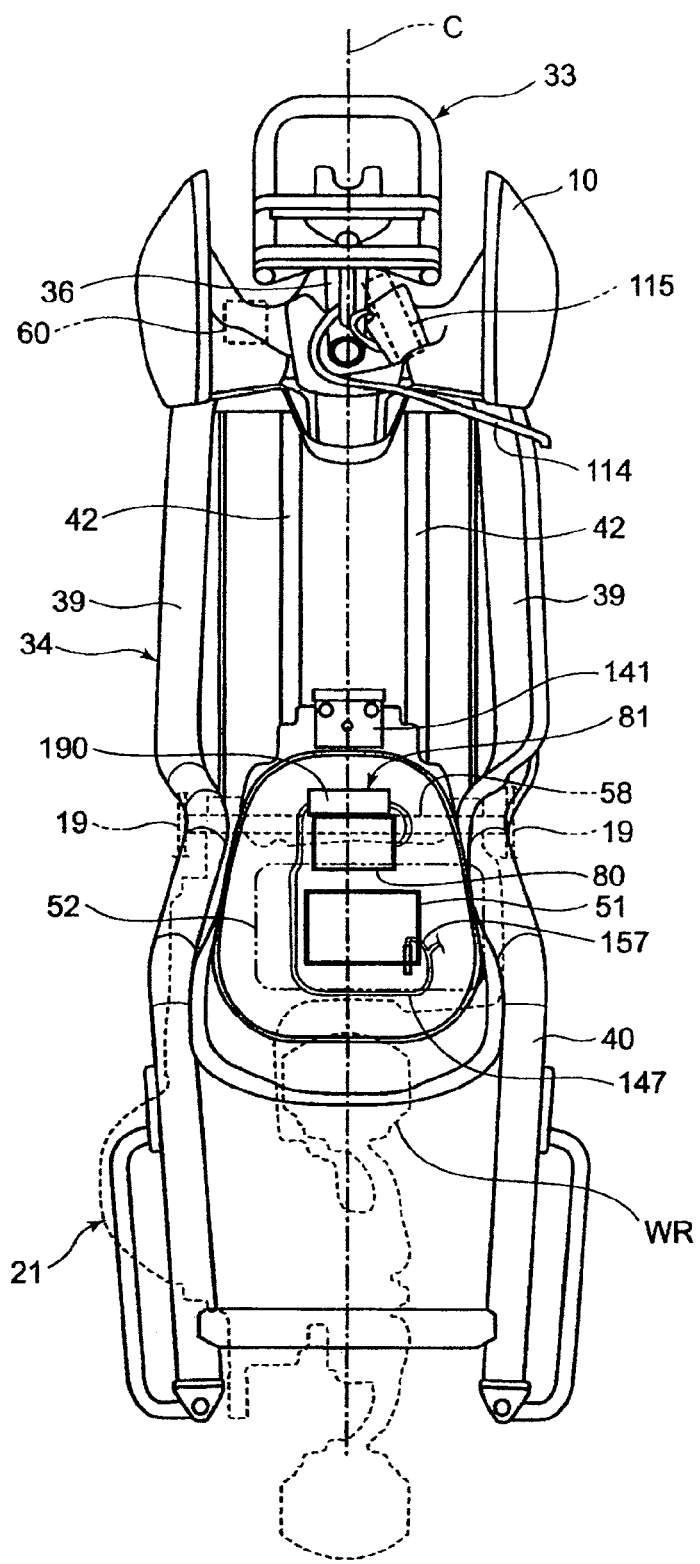
FIG. 23 is a top plan view showing a configuration of a vehicle body of an electric motorcycle.

FIG. 23 is a top plan view showing a vehicle body configuration of the electric motorcycle 1. Like reference characters to those described hereinabove denote like or equivalent elements. The leg shield 10 extends forwardly of the head pipe 36 in such a manner so as to cover the head pipe 36 from a sideward direction. The opposite side edges of the leg shield 10 are provided contiguously to the opposite side edges of the front cover 7 at left and right positions in the vehicle body widthwise direction of the front stay 33. By such a configuration as just described, miniaturization of the front cover 7 can be achieved. The speaker 60 is disposed on the left side in the vehicle widthwise direction of the head pipe 36, and the key cylinder 115 is disposed on the right side in the vehicle widthwise direction across the head pipe 36.

The swing arm 21 according to the present embodiment is of the cantilever type which supports the rear wheel WR only by the arm on the left side of the vehicle body. Since the electric motor M, a speed reduction mechanism and so forth are built in the inside of the cantilever arm, the position of the center of gravity of a rear portion of the vehicle body is likely to be displaced to the left side of the vehicle body. Therefore, in the present embodiment, not only the PDU 52 disposed in the proximity of the pivot shaft 58 is disposed in an offset relationship to the right side of the vehicle body with respect to the vehicle body center line C but also the low voltage battery 51 and the control unit 80 are disposed in an offset relationship to the right side of the vehicle body so that a balance of the position of the center of gravity in the leftward and rightward direction can be established. Further, also where the control unit 80a is disposed in the proximity of the steering handle member 9 on the right side as shown in FIG. 12, an effect of achieving a left and right balance of the position of the center of gravity can be obtained.

Figure 24:
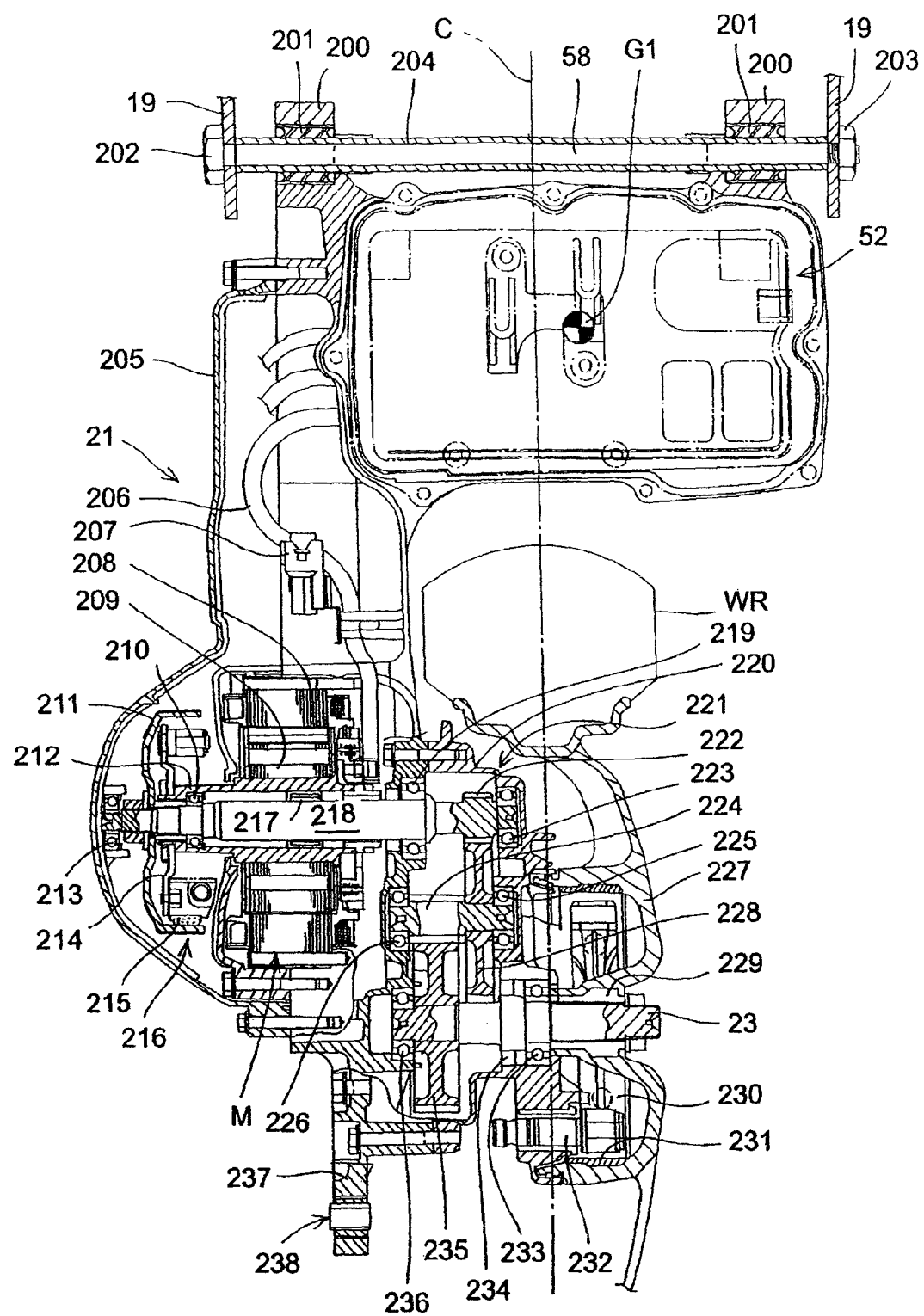
FIG. 24 is a sectional view of a swing arm as viewed from above the vehicle body.

FIG. 24 is a sectional view of the swing arm 21 as viewed from above the vehicle body. Like reference characters to those described hereinabove denote like or equivalent elements. The swing arm 21 is supported for rocking motion on a pair of left and right pivot plates 19 through the swing arm pivot 58 (pivot shaft). The pivot shaft 58 is an elongated bolt having a screw head 202 and is fitted in a cylindrical collar 204 supported by bosses 200 on the swing arm 21 side through bushes 201 and secured by a nut 203 on the right side in the vehicle widthwise direction. It is to be noted that the bushings 201 are thermally secured to the cylindrical collar 204, and a collar member of a small thickness is thermally secured to the outer periphery side of each of the bushes 201. The collar members and the bushings 201 are force fitted into through-holes of the bosses 200 to define the position of the swing arm 21 in the vehicle widthwise direction.

The PDU 52 is accommodated in a large width case section forwardly of the rear wheel WR. Consequently, the PDU 52 is disposed rather forwardly of the swing arm 21 in such a manner as to cross the vehicle body center line C, which passes the front and rear wheels of the electric motorcycle 1, in the vehicle widthwise direction. As described hereinabove, in the electric motorcycle 1, one-sidedness of the weight balance in the vehicle widthwise direction by offset disposition of the electric motor M to the left side in the vehicle widthwise direction is corrected by figuring out the disposition of the PDU 52 as described hereinabove. The position G1 of the center of gravity of the PDU 52 is positioned on the right side in the vehicle widthwise direction with respect to the vehicle body center line C.

The swing arm 21 according to the present embodiment is of the cantilever type which supports the rear wheel WR for rotation only by the arm section on the left side, and the electric motor M, a centrifugal clutch 216 as a clutching mechanism for rotational driving force, and a speed reducing mechanism 221 are disposed in a concentrated manner at a position on the vehicle body rear side of the arm section.

The electric motor M is of the inner rotor type which is formed from a stator 208 secured to an inner wall of the swing arm 21 and having a stator coil, and a rotor 209 secured to a motor driving shaft 212. The centrifugal clutch 216 is configured from a drive plate 214 on which a clutch shoe 215 is provided, and a clutch outer 211 for being driven by frictional resisting force of the clutch shoe 215. The drive plate 214 is secured to a left side end portion in the figure of the motor driving shaft 212, and the motor driving shaft 212 is secured to an output power shaft 218 which is fitted rotatably with the motor driving shaft 212. It is to be noted that the motor driving shaft 212 and the output power shaft 218 are configured for rotation relative to each other by a needle roller bearing 217 and a ball bearing 210.

The centrifugal clutch 216 is configured such that, if the speed of rotation of the motor driving shaft 212 becomes higher than a predetermined speed, that is, if the speed of rotation of the drive plate 214 becomes higher than a predetermined speed, then the clutch shoe 215 moves to the outer side in a diametrical direction to generate frictional resisting force so that the clutch outer 211 is driven to rotate. Consequently, the rotational driving force of the electric motor M is transmitted to the output power shaft 218. It is to be noted that a left side end portion in the vehicle widthwise direction of the output power shaft 218 is supported for rotation by a bearing 213 fitted in a swing arm cover 205. Meanwhile, the right side in the vehicle widthwise direction of the output power shaft 218 is supported for rotation by a bearing 219 fitted in a driving case 237 and a bearing 223 fitted in a reduction gear case 220. At a vehicle body rear end portion of the driving case 237, a supporting hole 238 for the rear cushion unit 31 is formed. An output wiring line 206 for the electric motor M and a connector 207 for a motor speed sensor (not shown) are disposed on the vehicle body front side of the electric motor M in a swing arm cover 205.

Rotational driving force transmitted to the output power shaft 218 is transmitted to the final output power shaft (axle) 23 through the speed reducing mechanism 221. More particularly, the rotational driving force is transmitted to the final output power shaft 23, which is rotatably supported by a bearing 236 secured to a second speed reducing gear wheel 235 and fitted in the driving case 237 and another bearing 233 fitted in the reduction gear case 220, through a first speed reducing gear wheel 228 which meshes with a speed reducing gear wheel 222 formed at a right side end portion in the figure of the output power shaft 218, a first speed reducing shaft 224 rotatably supported by a bearing 225 secured to the first speed reducing gear wheel 228 and fitted in the reduction gear case 220 and another bearing 226 fitted with the driving case 237, and a second speed reducing gear wheel 235 which meshes with a speed reduction gear wheel formed on the first speed reducing shaft 224.

A wheel 227 of the rear wheel WR is secured to a right side end portion of the final output power shaft 23 with a collar 229 interposed therebetween. A brake drum having a liner 231 is formed on the inner diameter side of the wheel 227, and a pair of upper and lower brake shoes 230 which are driven by a brake cam 232 around an axis provided by an anchor pin (not shown) are accommodated in the inner side of the brake drum. It is to be noted that an oil seal 234 is disposed on the rear side of the bearing 233.

Figure 25:
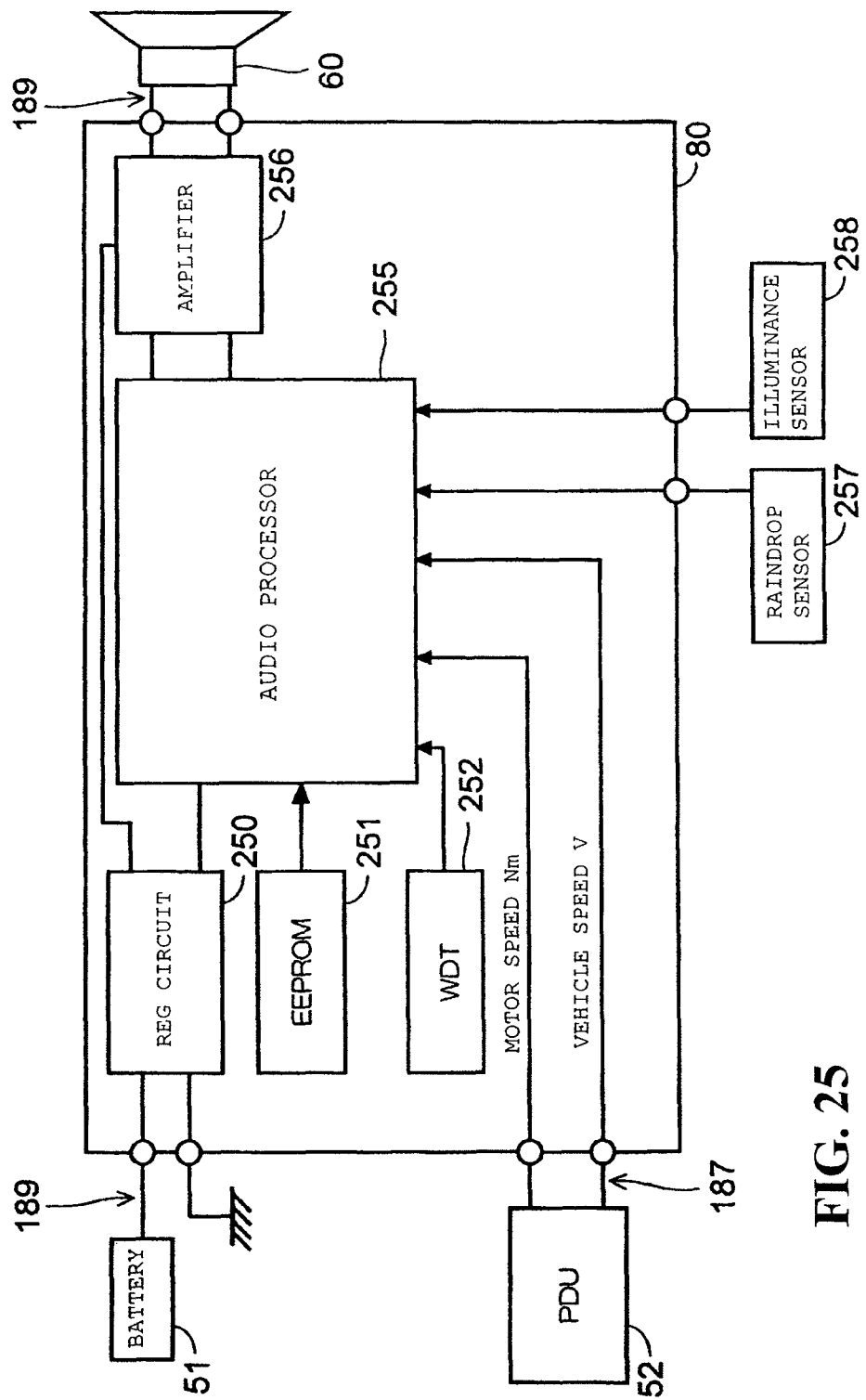
FIG. 25 is a block diagram showing a configuration of the control unit.

FIG. 25 is a block diagram showing a configuration of the control unit 80. The control unit 80 includes a REG (regulator) circuit 250, an EEPROM 251 as pseudo engine sound volume storage means in which sound sources and sound volumes of engine sound and so forth of engine vehicles are recorded, a WDT (watch dog timer) 252 for maintaining normal operation of the system, an audio processor 255, and an amplifier 256.

To the control unit 80, information from the PDU 52 is inputted through the first coupler 187. Further, to the REG circuit 250 of the control unit 80, the low voltage battery 51 is connected through the second coupler 189 of the two-pin type. Furthermore, to the amplifier 256 of the control unit 80, the speaker 60 is connected through the second coupler 189. To the audio processor 255, output information of the EEPROM 251 and the WDT 252 and a motor speed Nm and a vehicle speed V inputted from the PDU 52 are inputted.

The audio processor 255 calls a predetermined sound source from the EEPROM 251 based on information of the motor speed Nm and the vehicle speed V and outputs notification sound with a predetermined sound volume from the speaker 60 (and various second speakers) through the amplifier 256.

It is to be noted that, while an input portion from the low voltage battery 51 and an output portion from the amplifier 256 are shown separately from each other, both portions are collected to the second coupler 189 of the four-pin type. Further, to the audio processor 255, output information from a raindrop sensor 257 and a luminance sensor 258 can be inputted further. In this instance, this can be coped with, for example, by changing the second coupler 189 of the 4-pin type to that of the 6-pin type.

If it is detected by the raindrop sensor 257 that it is raining, then the audio processor 255 can increase the sound volume of notification sound from that in a normal state so that the perception effect of the notification sound may not be reduced by the sound of the rain. On the other hand, if it is detected by the luminance sensor 258 that it is nighttime, then the audio processor 255 can set the sound volume of the notification sound so as to be lower than that in a normal state. Also it is possible to apply a noise sensor or the like such that the sound volume of the notification sound is set so as to increase when the environmental noise is high, for example, because the traffic amount is great.

Figure 26:
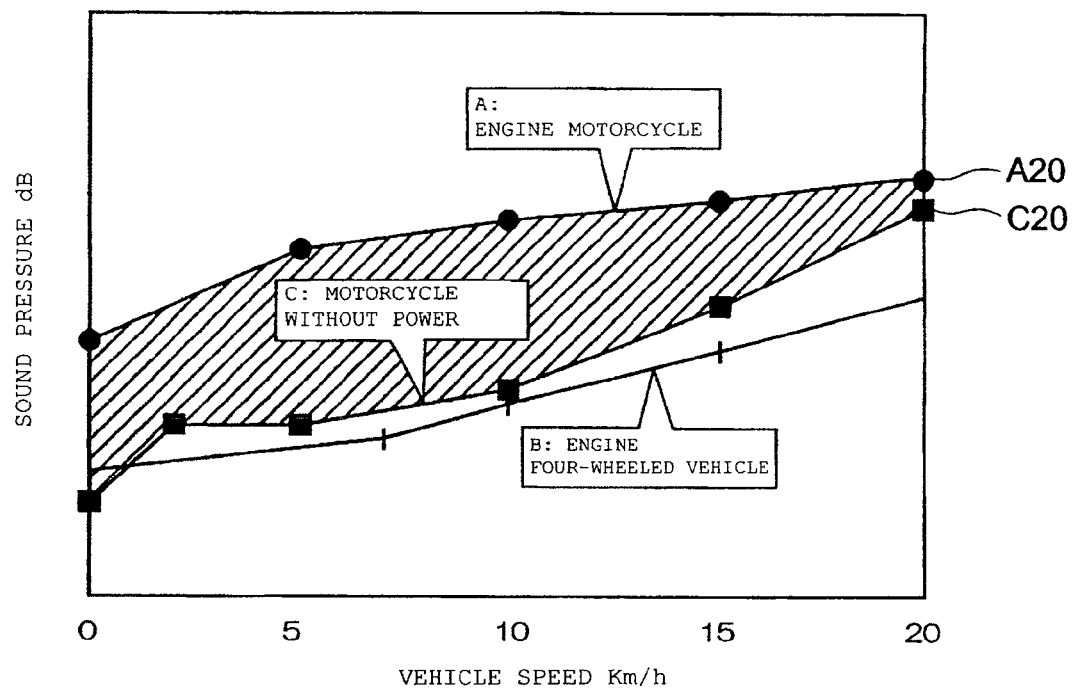
FIG. 26 is a graph illustrating a relationship between the vehicle speed and running sound of various vehicles.

FIG. 26 is a graph illustrating a relationship between the vehicle speed and the running sound in various vehicles. In this graph, A as an engine vehicle, B as an engine four-wheeled car, and C as a motorcycle without power are illustrated. In the case where the engine motorcycle and the engine four-wheeled car are compared with each other, the engine motorcycle which exhibits a high engine speed upon low speed running because the total engine displacement volume is small and wherein the engine is exposed outwardly of the vehicle body exhibits a generally high sound pressure level (sound volume).

In addition, the data of the motorcycle without power represented by C indicate a sound volume in the case where a vehicle for a test having no engine as a power source is driven. If attention is paid to the data of the motorcycle without power, running sound whose level a little exceeds that of the engine four-wheeled car immediately after starting thereof begins to indicate increase of the difference thereof after the vehicle speed exceeds 10 km/h. Then at the vehicle speed of 20 km/h, the running sound comes to C20 which is a little lower than A20 of the engine motorcycle. In other words, the ratio in engine sound in the overall running sound decreases as the vehicle speed increases, and at the vehicle speed of 20 km/h, the influence of presence/absence of engine sound to be had on the running sound is small.

From the foregoing, in the approach notification apparatus according to the present embodiment, the notification sound is set such that it is outputted from the speaker with such a sound volume that a slanting line portion representing the difference between the motorcycle without power of C and the engine motorcycle of A may be filled up in order to implement running sound equivalent to that of the engine motorcycle. Further, the notification sound from the speaker is set such that it is not outputted if the vehicle speed exceeds 20 km/h.

Figure 27:
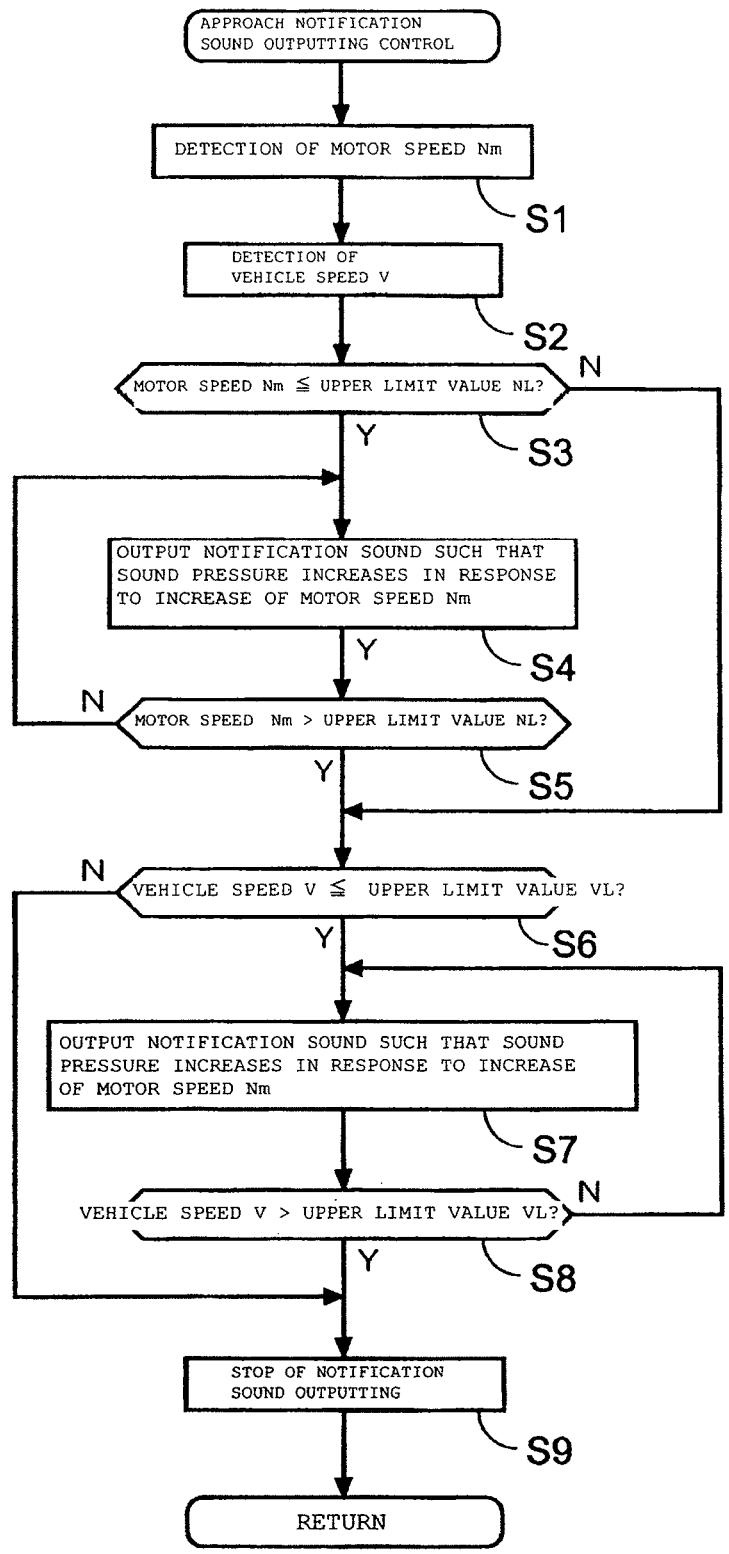
FIG. 27 is a flow chart illustrating a procedure of approach notification sound output control.

FIG. 27 is a flow chart illustrating a procedure of approach notification sound outputting control. At step S1, the motor speed Nm is detected based on information from the PDU 52, and at step S2, the vehicle speed V is detected based on the information from the PDU 52. At step S3, it is decided whether or not the motor speed Nm is equal to or lower than an upper limit value NL. This upper limit value NL is set to a connection speed of the centrifugal clutch 216 (refer to FIG. 24) disposed on the output transmission route of the electric motor M.

At step S4, notification sound is outputted from the speaker 60 such that the sound volume thereof increases in response to the increase of the motor speed Nm. Then at step S5, it is decided whether or not the motor speed Nm exceeds the upper limit value NL, and if an affirmative decision is made, then the processing advances to step S6, but if a negative decision is made, then the processing returns to step S4. In other words, in a non-running state before the centrifugal clutch is connected, the notification sound is outputted such that it increases in response to the speed of rotation of the electric motor M.

At step S6, it is decided whether or not the vehicle speed V is equal to or lower than an upper limit value VL. In the present embodiment, the upper limit value VL is set to the vehicle speed of 20 km/h. If an affirmative decision is made at step S6, then the processing advances to step S7, at which the notification sound is outputted such that the difference in the sound volume thereof from a target sound volume may be filled up in response to increase of the vehicle speed V. In the present embodiment, as illustrated in the graph of FIG. 26, the notification sound is outputted such that the slanting line portion between the motorcycle without power of C and the engine motorcycle of A may be filled up.

Sound volumes of notification sounds at individual predetermined vehicle speeds can be set in advance as sound volume data in accordance with individual vehicles by an experiment or the like, and the set data can be retained into the EEPROM 251 (refer to FIG. 25) of the control unit 80. In the present embodiment, the sound volume of notification sound is set such that running sound equivalent to that of a vehicle with a prime mover which incorporates a 50-cc engine corresponding to the automobile rank of the electric motorcycle 1 is outputted. However, for example, in the case where the automobile rank of an electric motorcycle corresponds to a motorcycle of a total engine displacement volume greater than 50 cc but smaller than 400 cc, running sound equivalent to that of a motorcycle which incorporates a 400-cc engine can be outputted. It is to be noted that, the relationship between the vehicle rank of an electric motorcycle and the sound volume of notification sound can be set arbitrarily in response to the vehicle category, the license category and so forth in the road traffic act.

Then at step S8, it is decided whether or not the vehicle speed V exceeds the upper limit value VL, and if an affirmative decision is made, then the processing advances to step S9, at which the outputting of notification sound is stopped, thereby ending the series of controls. It is to be noted that, if a negative decision is made at step S6, then the processing advances to step S9, but if a negative decision is made at step S8, then the processing returns to step S7.

With such approach notification sound outputting control as described above, it is possible to output approach a notification sound with a sound volume which conforms to a running sound of an actual engine vehicle in comparison with such a controlling method that the sound volume is increased merely based on an increase in the motor speed or the vehicle speed. In particular, the approach notification sound can be controlled such that running sound equivalent to that of an engine vehicle corresponding to the vehicle rank or the vehicle category of the electric motorcycle. Further, the tone of the approach notification sound may be selected from recorded sound data from an engine vehicle corresponding to the vehicle rank or the vehicle category of the electric motor or from among various tones of sound.

It is to be noted that the structure, disposition and so forth of the various speakers which output notification sound and the control unit which controls the speakers are not limited to those of the embodiments described above but can be altered in various manners. The approach notification apparatus according to the present invention can be applied not only to an electric motorcycle but also to various electric vehicles such as three/four-wheeled vehicles of the saddle type and so forth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle approach notification apparatus for an electric motorcycle for outputting a notification sound from a speaker attached to a vehicle body, in order to notify an individual, such as a walker, or an approaching vehicle, the vehicle approach notification apparatus comprising:
a front cover mounted in a position forward of a head pipe of a vehicle body frame; and
a key cylinder of a main switch,
wherein the speaker is mounted in a position rearward of the front cover, forward of the head pipe, and facing one lateral side of the head pipe,
wherein the key cylinder is disposed in a position on an opposite lateral side of the head pipe in relation to the speaker, and
the speaker has a sound emitting direction directed in a forward direction from a vehicle body rear side of the front cover,
the vehicle approach notification apparatus further comprising:
a sensor main body of a throttle opening sensor disposed at a position below the key cylinder on the vehicle body rear side of the front cover, and
a throttle cable connected to the sensor main body passes in an arcuately curved state between the head pipe and the speaker forwardly of the head pipe,
wherein the throttle cable is connected to a pulley attached to said sensor main body.

2. The vehicle approach notification apparatus for an electric motorcycle according to claim 1, further comprising:
a front stay adapted to support a front carrier,
wherein the front carrier stay is disposed on a front side of the front cover,
the front stay is attached to a vehicle body front side of the head pipe in a position rearward of the front cover, and
the speaker is attached to a rear side case of the vehicle body in a position above the front stay as viewed in a front elevation of the vehicle body.

3. The vehicle approach notification apparatus for an electric motorcycle according to claim 2, wherein the speaker is disposed above the front carrier as viewed in the front elevation of the vehicle body.

4. The vehicle approach notification apparatus for an electric motorcycle according to claim 2, further comprising:
a second speaker provided centrally in a widthwise direction of the electric motorcycle in a position below a seat of the electric motorcycle, and
a sound guiding duct for guiding the sound generated from the second speaker in leftward and rightward directions of the vehicle body.

5. The vehicle approach notification apparatus for an electric motorcycle according to claim 1, further comprising:
a leg shield disposed continuously along a rear side of the front cover, and in an opposing relationship to both legs of a rider; and
a second speaker provided centrally in a widthwise direction of the motorcycle in a position of the vehicle body below a seat of the motorcycle, and having a sound emitting direction directed in a forward direction of the vehicle body,
wherein an emitted sound from the second speaker is reflected in at least to a sideward direction of the vehicle body by the leg shield disposed continuously along the rear side of the front cover.

6. The vehicle approach notification apparatus for an electric motorcycle according to claim 5, wherein the second speaker is attached to a wall face on a vehicle body front side of an accommodating box provided below seat.

7. The vehicle approach notification apparatus for an electric motorcycle according to claim 1, wherein the speaker is disposed on a left side in a vehicle widthwise direction of the head pipe.

8. The vehicle approach notification apparatus for an electric motorcycle according to claim 7, further comprising:
a cover member removably attached to a position on the front cover forward of the speaker,
wherein the cover member includes a passing hole adapted to emit a sound from the speaker.

9. The vehicle approach notification apparatus for an electric motorcycle according to claim 1, further comprising:
a second speaker provided substantially at a central position of the vehicle body below a seat of the electric motorcycle, and
a sound guiding duct for guiding a sound generated from the second speaker in leftward and rightward directions of the vehicle body.

10. The vehicle approach notification apparatus for an electric motorcycle according to claim 1, further comprising:
a cover member removably attached to a position on the front cover forward of the speaker,
wherein the cover member includes a passing hole adapted to emit a sound from the speaker.

11. The vehicle approach notification apparatus for an electric motorcycle according to claim 10, further comprising:
an opening area of the cover member configured such that the passing hole is variable.

12. The vehicle approach notification apparatus for an electric motorcycle according to claim 11,
wherein the cover member includes:
a base member having a window portion as the passing hole, and a rotatable plate adapted to block-off at least part of the window portion, and
an operating projection, adapted to operate the rotatable plate from a vehicle body front side to change a degree of a blocking-out degree of the window portion, is formed on said rotatable plate.

13. The vehicle approach notification apparatus for an electric motorcycle according to claim 1, further comprising: a second speaker provided centrally in a widthwise direction of the motorcycle in a position of the motorcycle below a low floor, and having a sound emitting direction directed in a vehicle body downward direction, and
a sound guiding duct with a horn shape provided around the second speaker.

14. The vehicle approach notification apparatus for an electric motorcycle according to claim 13, wherein the second speaker and the sound guiding duct are attached to a bottom face of a battery case provided below the low floor.

15. A vehicle approach notification apparatus for an electric motorcycle for outputting a notification sound from a speaker attached to a vehicle body, in order to notify an individual, such as a walker, or an approaching vehicle,
the vehicle approach notification apparatus comprising:
a front cover mounted in a position forward of a head pipe of a vehicle body frame; and
a key cylinder of a main switch,
wherein the speaker is mounted in a position rearward of the front cover, forward of the head pipe, and facing one lateral side of the head pipe,
wherein the key cylinder is disposed in a position on an opposite lateral side of the head pipe in relation to the speaker, and
the speaker has a sound emitting direction directed in a forward direction from a vehicle body rear side of the front cover, and
further comprising:
a leg shield having opposite side edges provided contiguously to opposite side edges of the front cover, the leg shield extending forwardly of the head pipe, in such a manner so as to cover the speaker and the head pipe from a sideward direction, and extending downwardly to a forward portion of a low floor where a rider places both feet; and
a second speaker provided centrally in a widthwise direction of the motorcycle in a position below a seat of the motorcycle,
wherein a sound emitted from the second speaker is directed in a forward direction, and then is reflected in at least to the sideward direction by the leg shield covering the speaker and the head pipe from the sideward direction,
the vehicle approach notification apparatus further comprising:
a cover member removably attached to a position on the front cover forward of the speaker,
wherein the cover member includes a passing hole adapted to emit a sound from the speaker.

16. The vehicle approach notification apparatus for an electric motorcycle according to claim 15, further comprising:
a sensor main body of a throttle opening sensor disposed at a position below the key cylinder on the vehicle body rear side of the front cover, and
a throttle cable connected to the sensor main body passes in an arcuately curved state between the head pipe and the speaker forwardly of the head pipe,
wherein the throttle cable is connected to a pulley attached to said sensor main body.

17. A vehicle approach notification apparatus for an electric motorcycle for outputting a notification sound from a speaker attached to a vehicle body, in order to notify an individual, such as a walker, or an approaching vehicle,
the vehicle approach notification apparatus comprising:
a front cover mounted in a position forward of a head pipe of a vehicle body frame; and
a key cylinder of a main switch,
wherein the speaker is mounted in a position rearward of the front cover, forward of the head pipe, and to one lateral side of the head pipe,
wherein the key cylinder is disposed in a position on an opposite lateral side of the head pipe in relation to the speaker, and
the speaker has a sound emitting direction directed in a forward direction from a vehicle body rear side of the front cover, and
further comprising:
a second speaker provided centrally in a widthwise direction of the motorcycle in a position below a low floor, and having a sound emitting direction directed in a vehicle body downward direction, and
a sound guiding duct with a horn shape provided around the second speaker,
wherein the sound guiding duct with the horn shape opens downwardly at a position near to a road surface G.

18. The vehicle approach notification apparatus for an electric motorcycle according to claim 17, further comprising:
a cover member removably attached to a position on the front cover forward of the speaker,
wherein the cover member includes a passing hole adapted to emit a sound from the speaker.

19. The vehicle approach notification apparatus for an electric motorcycle according to claim 18, further comprising:

a sensor main body of a throttle opening sensor disposed at a position below the key cylinder on the vehicle body rear side of the front cover, and a throttle cable connected to the sensor main body passes in an arcuately curved state between the head pipe and the speaker forwardly of the head pipe, wherein the throttle cable is connected to a pulley attached to said sensor main body.

20. The vehicle approach notification apparatus for an electric motorcycle according to claim 17, further comprising:

a sensor main body of a throttle opening sensor disposed at a position below the key cylinder on the vehicle body rear side of the front cover, and a throttle cable connected to the sensor main body passes in an arcuately curved state between the head pipe and the speaker forwardly of the head pipe, wherein the throttle cable is connected to a pulley attached to said sensor main body.

* * * * *